United States Patent
Frey et al.

(10) Patent No.: US 10,613,668 B2
(45) Date of Patent: Apr. 7, 2020

(54) TOUCH SENSOR HAVING AU-SHAPED ELECTRONICALLY CONDUCIVE MICROMESH

(71) Applicant: 3M INNOVATIVE PROPERTIES COMPANY, St. Paul, MN (US)

(72) Inventors: Matthew H. Frey, Cottage Grove, MN (US); Robert R. Kieschke, Woodbury, MN (US); Billy L. Weaver, Eagan, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 123 days.

(21) Appl. No.: 15/873,264

(22) Filed: Jan. 17, 2018

(65) Prior Publication Data

US 2018/0157364 A1    Jun. 7, 2018

Related U.S. Application Data

(63) Continuation of application No. 13/701,527, filed as application No. PCT/US2011/039552 on Jun. 8, 2011, now Pat. No. 9,904,393.

(60) Provisional application No. 61/353,688, filed on Jun. 11, 2010.

(51) Int. Cl.
*G06F 3/041* (2006.01)
*G06F 3/044* (2006.01)
*H01H 65/00* (2006.01)

(52) U.S. Cl.
CPC ............ *G06F 3/0414* (2013.01); *G06F 3/044* (2013.01); *H01H 65/00* (2013.01); *G06F 2203/04112* (2013.01); *Y10T 29/49105* (2015.01)

(58) Field of Classification Search
None
See application file for complete search history.

(56) References Cited

U.S. PATENT DOCUMENTS

| | | | |
|---|---|---|---|
| 3,654,579 A * | 4/1972 | Kurtz | G01L 9/0054 257/417 |
| 3,662,105 A | 5/1972 | Hurst | |
| 4,307,275 A | 12/1981 | Larson | |
| 4,516,112 A | 5/1985 | Chen | |

(Continued)

FOREIGN PATENT DOCUMENTS

| JP | 2010-026938 | 2/2010 |
|---|---|---|
| JP | 2010-039537 | 2/2010 |

(Continued)

OTHER PUBLICATIONS

Definition of uniform, 2018, https://www.dictionary.com/browse/uniform, p. 1 (Year: 2018).*

(Continued)

*Primary Examiner* — Priyank J Shah
*Assistant Examiner* — Kirk W Hermann
(74) *Attorney, Agent, or Firm* — Clifton F. Richardson

(57) ABSTRACT

A touch sensor is provided that includes a transparent, insulating substrate and at least one U-shaped electrically conductive micromesh that includes traces disposed on the substrate. The traces include an elemental metal or an alloy of elemental metal. The touch sensor may be configured to determine a location and a magnitude of a force of a touch.

20 Claims, 6 Drawing Sheets

(56) References Cited

U.S. PATENT DOCUMENTS

| | | | |
|---|---|---|---|
| 4,644,100 A * | 2/1987 | Brenner | G06F 3/0436 178/18.04 |
| 5,062,198 A * | 11/1991 | Sun | G06F 3/045 156/291 |
| 5,126,007 A | 6/1992 | Shmulovich | |
| 5,492,611 A | 2/1996 | Sugama | |
| 5,512,131 A | 4/1996 | Kumar | |
| 5,541,372 A * | 7/1996 | Baller | G06F 3/0414 178/18.01 |
| 5,763,091 A | 6/1998 | Kawata | |
| 5,867,808 A | 2/1999 | Selker et al. | |
| 5,915,285 A * | 6/1999 | Sommer | G01L 1/2287 338/2 |
| 6,080,487 A | 6/2000 | Coggio | |
| 6,472,804 B2 | 10/2002 | Mueller | |
| 6,549,193 B1 | 4/2003 | Huang | |
| 6,775,907 B1 | 8/2004 | Boyko | |
| 6,781,579 B2 | 8/2004 | Huang | |
| 6,809,280 B2 | 10/2004 | Divigalpitiya | |
| 7,148,882 B2 | 12/2006 | Kamrath | |
| 7,509,881 B2 | 3/2009 | Divigalpitiya | |
| 7,538,760 B2 | 5/2009 | Hotelling | |
| 2003/0114560 A1 | 6/2003 | Yang | |
| 2005/0076824 A1 | 4/2005 | Cross | |
| 2005/0083307 A1 | 4/2005 | Aufderheide | |
| 2005/0127357 A1 * | 6/2005 | Wong | H01L 27/12 257/59 |
| 2005/0131578 A1 | 6/2005 | Weaver | |
| 2006/0097991 A1 | 5/2006 | Hotelling | |
| 2006/0132450 A1 * | 6/2006 | Yamada | G06F 3/041 345/173 |
| 2006/0181522 A1 * | 8/2006 | Nishimura | G06F 3/016 345/177 |
| 2007/0018076 A1 * | 1/2007 | Chen | G06F 3/0412 250/208.2 |
| 2007/0024595 A1 | 2/2007 | Baker | |
| 2007/0160811 A1 | 7/2007 | Gaides | |
| 2007/0240914 A1 | 10/2007 | Lai et al. | |
| 2008/0002088 A1 | 1/2008 | Ong | |
| 2008/0180399 A1 | 7/2008 | Cheng | |
| 2008/0259262 A1 | 10/2008 | Jones | |
| 2008/0286447 A1 | 11/2008 | Alden et al. | |
| 2009/0219257 A1 | 9/2009 | Frey | |
| 2009/0231305 A1 | 9/2009 | Hotelling | |
| 2009/0237374 A1 | 9/2009 | Li | |
| 2009/0243817 A1 | 10/2009 | Son | |
| 2009/0278799 A1 | 11/2009 | Wilson | |
| 2009/0309616 A1 | 12/2009 | Klinghult | |
| 2010/0013785 A1 | 1/2010 | Murai | |
| 2010/0045629 A1 | 2/2010 | Newton | |
| 2010/0068460 A1 | 3/2010 | Moriyama | |
| 2010/0097347 A1 | 4/2010 | Lin | |
| 2010/0099394 A1 | 4/2010 | Hainzl | |
| 2010/0117974 A1 | 5/2010 | Joguet | |
| 2010/0123670 A1 | 5/2010 | Philipp | |
| 2010/0128002 A1 | 5/2010 | Stacy | |
| 2010/0243295 A1 * | 9/2010 | Allemand | B82Y 10/00 174/250 |
| 2011/0260741 A1 | 10/2011 | Weaver | |
| 2012/0038559 A1 | 2/2012 | Radivojevic et al. | |
| 2012/0193130 A1 | 8/2012 | Fix et al. | |
| 2013/0020557 A1 | 1/2013 | Roscheisen et al. | |

FOREIGN PATENT DOCUMENTS

| | | |
|---|---|---|
| JP | 2010-108878 | 5/2010 |
| KR | 2009-0114509 | 11/2009 |
| TW | 201013474 | 4/2010 |
| WO | WO 1994-002921 | 2/1994 |
| WO | WO 2002-035461 | 5/2002 |
| WO | WO 2009-108765 | 9/2009 |
| WO | WO 2010-002519 | 1/2010 |
| WO | WO 2010-002679 | 1/2010 |
| WO | WO 2010-074116 | 7/2010 |
| WO | WO 2011-139547 | 11/2011 |

OTHER PUBLICATIONS

International Search Report for International Application No. PCT/US2011/039552, dated Nov. 3, 2011, 3 pages.

* cited by examiner

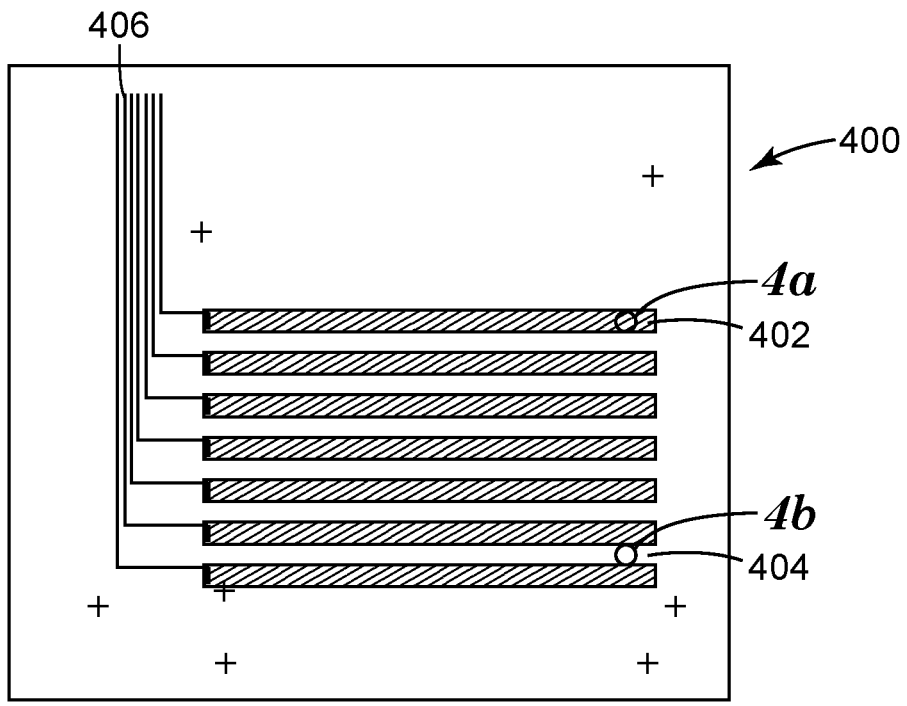
FIG. 4
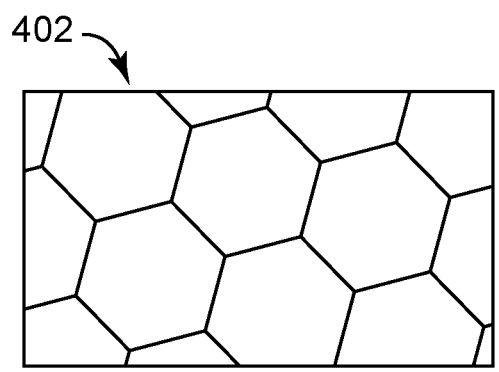 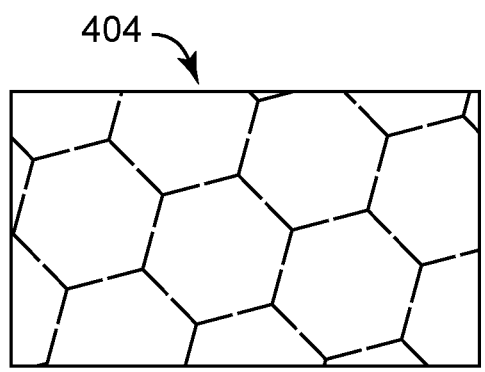
FIG. 4a    FIG. 4b

TOUCH SENSOR HAVING AU-SHAPED ELECTRONICALLY CONDUCIVE MICROMESH

FIELD

Touch sensors that can measure applied force and are useful on electronic displays are provided.

BACKGROUND

Positional Touch screen sensors detect the location of an object (e.g. a finger or a stylus) applied to the surface of a touch screen display or the location of an object positioned near the surface of a touch screen display. These sensors detect the location of the object along the surface of the display, e.g. in the plane of a flat rectangular display. Examples of positional touch screen sensors include capacitive sensors, resistive sensors, and projected capacitive sensors. Such sensors include transparent conductive elements that overlay the display. The conductive elements can be combined with electronic components that can use electrical signals to probe the conductive elements in order to determine the location of an object near or in contact with the display.

In addition to positional sensing, it is often useful for user input devices (e.g., computer user input devices) such as touch screen displays to measure the magnitude of force associated with a touch event. A number of designs and constructions for touch screen display sensors that include force measurement have been described previously. Designs and constructions for touch screen display sensors that include force measurement include examples based on strain gauges such as is disclosed in U.S. Pat. No. 5,541,371 (Baller et al.); examples based on capacitance change between conductive traces or electrodes residing on different layers within the sensor, separated by a dielectric material or a dielectric structure comprising a material and air such as is disclosed in U.S. Pat. No. 7,148,882 (Kamrath et al.) and U.S. Pat. No. 7,538,760 (Hotelling et al.); examples based on resistance change between conductive traces residing on different layers within the sensor, separated by a piezoresistive composite material such as is disclosed in U.S. Pat. Publ. No. 2009/0237374 (Li et al.); and examples based on polarization development between conductive traces residing on different layers within the sensor, separated by a piezoelectric material such as is disclosed in U.S. Pat. Publ. No. 2009/0309616 (Klinghult et al.). Most such touch screen display sensors that measure the force of touch are limited by certain deficiencies. Those deficiencies include a propensity for transparent conductive elements (e.g., elements based on indium tin oxide) to crack when strained, conspicuous sensing elements that are unsuitable for interposing between a device user and an information display since they can substantially obscure the viewability of the display, and bulky force measurement components that can lead to undesirable device or bezel thickness or other large device dimensions.

SUMMARY

Accordingly, a need persists in the field for touch display sensor systems that can measure position and force of touch without conductive material cracking, without obscuring the viewability of the information display, and without the use of bulky components that lead to undesirable product design. The provided sensors overcome some or all of these deficiencies.

In one aspect an article is provided that includes an electronic display having a viewable region, a transparent, insulating substrate having a surface, and a force-sensing element comprising at least one micropattern of metallic traces disposed upon the surface of the substrate, wherein the transparent insulating substrate is disposed upon the electronic display, and wherein the force-sensing element overlays at least a portion of the viewable region of the electronic display without substantially obscuring the viewable region of the display. The article can further comprise a transparent positional touch-sensing element disposed upon the electronic display. Also provided is a method of making a provided touch screen display by disposing a metallic coating upon the surface of the substrate and at least partially etching the metal to form a micropattern of conductive traces disposed upon the substrate. The method can further include providing an inked stamp with raised features and contacting the raised features of the inked stamp to the metallic coating before at least partially etching the metal. The method can further include providing an inked stamp with raised features, wherein the inked stamp is inked with self-assembled monolayer-forming molecules, and contacting the raised features of the inked stamp to the metallic coating before partially etching the metal.

In another aspect, an article is provided that includes an electronic display having a viewable region, a transparent, insulating substrate disposed upon at least a portion of the viewable region of the electronic display, and a touch sensor disposed upon a surface of the substrate that overlays at least a portion of the viewable region of the electronic display, wherein the touch sensor comprises a force-sensing element, wherein the force-sensing element comprises a first set of bands of micromesh and a second set of bands of micromesh, wherein the bands of micromesh each comprise traces of a metallic conductor, wherein the first and second sets of bands of micromesh occupy substantially parallel planes that are spaced apart in the direction normal to the planes, and wherein at least one band of the first set of bands of micromesh crosses over at least one band of the second set of bands of micromesh. The provided article can further comprise an electronic display having a viewable region, wherein the force-sensing element that overlays at least a portion of the viewable region of the display without substantially obscuring the viewable region of the display.

In this disclosure,

"conductive trace" refers to a narrow, linear pattern element in a pattern of conductive material; for example a conductive line of width 2 micrometers that is 100 micrometers in length;

"electrically-conducting" refers to materials having a bulk electrical resistivity between about $10^{-6}$ to 1 ohm-cm;

"force-sensing element" refers to a portion of a sensor or device that is affected by the force of a touch event in such a way that the degree of effect is related to the magnitude of the force of the touch event and in such a way that the magnitude can be at least approximately measured using electronics that are attached to the force-sensing element; a force-sensing element as used herein can measure force directly or can measure a related property;

"integrate" or "integration" refers to placing or having a passive circuit element, a force-sensing element, or a capacitive sensing element directly disposed upon the surface of a substrate; an integrated passive circuit element is in contrast to a discrete passive circuit element, for example a chip resistor or chip capacitor that must be bonded to a substrate and electrically connected to a substrate (for example solder-bonded or wire-bonded);

"mesh" refers to a two-dimensional network of conductive traces, for example traces that run orthogonal to each other to yield a rectangular (e.g., square) grid;

"metal" or "metalized" refers to a conductive material such as an elemental metal or alloy which is suitably conductive for the intended purpose.

"non-conductive" and "insulating" are used interchangeably, and the terms refer to materials that are substantially not electrically-conducting, for example materials that have a bulk electrical resistivity of at least $10^6$ ohm-cm, preferably at least $10^8$ ohm-cm, more preferably at least $10^{12}$ ohm-cm;

"open area fraction" (or open area or percentage of open area) of a conductor micropattern, or region of a conductor micropattern, or region of a sensor that comprises at least a portion of a force-sensing conductor micropattern and at least a portion of a touch-sensing micropattern, is the proportion of the micropattern or micropatterns that is not shadowed by the conductor; open area fraction (or open area or percentage or open area) can be expressed as a decimal, a fraction, or a percentage;

"positional touch-sensing element" refers to an element that can detect the location of one or more touch or near touch events on the surface of the element or along the surface of an additional element that overlays the positional touch-sensing element;

"substantially parallel" refers to pattern elements that are approximately oriented in some way along the same direction; examples of substantially parallel pattern elements are bands of micromesh (elongated stripes or strips) that are oriented in the same direction and that are adjacent but spaced apart in a plane; some substantially parallel pattern elements can have deviations in straightness or parallelism;

"self-assembled monolayer" or "SAM" refers to a monomolecular layer of molecules that are attached (e.g., by a chemical bond) to a surface and that have adopted a preferred orientation with respect to that surface and even with respect to each other;

"touch sensor or sensing" or "touch screen" refer to sensor elements that can be activated by physical or proximal touching (indirect-disturbing the electric field) with one or more body parts (i.e., one or more fingers) and can detect the force of a touch event, the position of a touch event or both; and "visible light transparent" refers to the level of transmission being at least 60 percent transmissive to visible light, where the percent transmission is normalized to the intensity of the incident.

The provided articles and methods that include the provided touch sensors overcome the deficiencies of previous touch screen display sensors that can measure force. The provided articles include touch sensors that are transparent, and include bands of conductive micromesh that resist cracking when strained and minimally obscure the viewability of the display upon which they are disposed. Additionally, the provided articles and methods avoid the use of bulky components.

The above summary is not intended to describe each disclosed embodiment of every implementation of the present invention. The brief description of the drawings and the detailed description which follows more particularly exemplify illustrative embodiments.

BRIEF DESCRIPTION OF THE DRAWINGS

FIG. 1b is an exploded illustration showing one force-sensing element included on the substrate shown in FIG. 1a.

FIG. 3a is an illustration of the native sensor and FIG. 3b is an illustration of the sensor when it is compressed by a localized force, as occurs when touched and pressed, for example with a finger.

FIGS. 4, 4a, and 4b are schematic illustrations of an embodiment of a provided article.

DETAILED DESCRIPTION

Figure 1A:
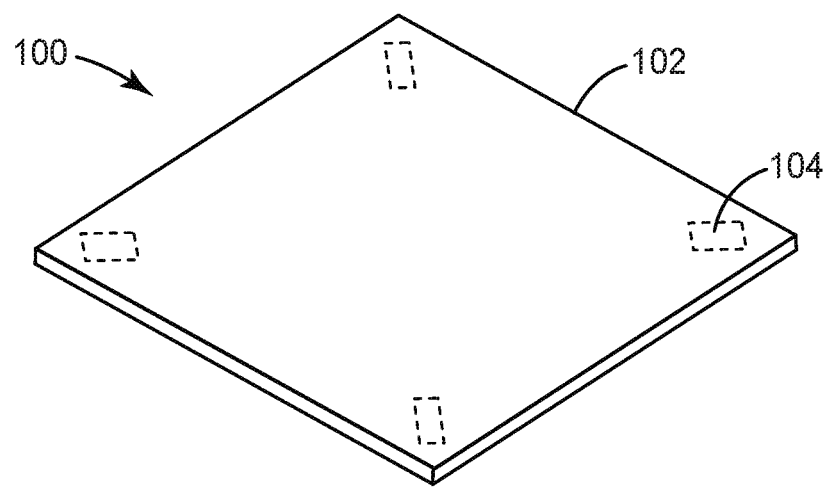
FIG. 1a is a perspective view of a substrate that includes four force-sensing elements disposed upon the surface of the substrate.

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

An article is provided that includes an electronic display having a viewable region. The electronic display can be any visible display of information that is a part of or in electronic communication with an electronic device. Examples of electronic displays include flat panel displays that contain electroluminescent (EL) lamps, light-emitting diodes (LEDs), organic light-emitting diodes (OLEDs), or plasma components that create visible radiation—usually in a matrix display. Other examples of electronic displays include reflective or backlit liquid crystal displays (LCD). Yet other examples of electronic displays include reflective displays such as electrophoretic (EP) displays or electrowetting displays. The display has a viewable region which may comprise the whole area of the display or some part of the display that can be viewed, for example, through an opening in a housing or through a frame. Generally, the viewable region of an electronic display is that region which includes means for rendering changeable information in the form of images, figures, or text.

The provided sensors include a substrate that is disposed upon the electronic display. The substrate can be a transparent insulating substrate, such as glass, polymer, ceramic, or any other substrate that is visible light transparent. Exemplary useful polymers for the transparent insulating substrate include polyethylene terephthalate (PET), polyethylene naphthalene (PEN), polyimide (PI), and triacetate cellulose (TAC). As used herein, "visible light transparent" refers to the level of transmission being at least 60 percent transmissive to at least one polarization state of visible light, where the percent transmission is normalized to the intensity of the incident, optionally polarized light. It is within the meaning of visible light transparent for an article that transmits at least 60 percent of incident light to include patterns of opaque material contained therein or thereon with microscopic features (e.g., dots, squares, or lines with minimum dimension, e.g. width, between 0.5 and 10 micrometers, or between 1 and 5 micrometers) that block light locally to less than 80 percent transmission (e.g., 0 percent); however, in such cases, for an approximately equiaxed area including the microscopic feature and measuring 1000 times the minimum dimension of the microscopic feature in width, the average transmittance is greater than 60 percent.

Alternatively, for some applications, the substrate can be opaque in some regions of the visible light spectrum but can still have a viewable region that is transparent. The substrate can have a surface capable of supporting a force-sensing element. As such, the substrate can itself, be non-conductive and it can have a surface upon which conductive traces can be located. In some embodiments, additional layers (e.g., one to three additional layers) may be imposed between the substrate and the pattern of conductive traces. For example, a passivation layer that smooths out the surface of the substrate can be present between the substrate and the pattern of conductive traces. In these cases, the substrate may or may not be conductive, but the layer upon which the pattern of conductive traces is directly disposed needs to be non-conductive.

In some embodiments, the provided article includes a force-sensing element comprising a metallic conductor micropattern (used interchangeable herein with "micropattern of metallic traces") with features having minimum dimension of between 0.5 and 20 micrometers. In other embodiments, the minimum dimension of features of the metallic conductor micropattern of the force-sensing element is between 1 and 5 micrometers. In other embodiments, the minimum dimension of features of the metallic conductor micropattern of the force-sensing element is between 1.5 and 4 micrometers. By minimum dimension, what is meant is that the smallest dimension that can be measured for the conductor micropattern. For example, for a micropattern consisting of linear conductive traces, the minimum dimension is the width of the traces (or the width of the narrowest trace or traces). In some embodiments, the open area fraction of the metallic conductor micropattern of the force-sensing element can be between 80 percent and 99.75 percent. In some other embodiments, the open area fraction of the metallic conductor micropattern of the force-sensing element can be between 90 and 99.5 percent. In other embodiments, the open area fraction of the metallic conductor micropattern of the force-sensing element can be between 95 and 99 percent. In some embodiments, the metallic conductor micropattern has a conductor trace with of about [X+0.5] in units of micrometers; and an open area fraction between about [95−X] % and 99.5%, where 0≤X≤4.5. In some other embodiments, the metallic conductor micropattern has an open area fraction of between about [98.5−(2.5X÷3.5)] % and [99.5−(X÷3.5)] % wherein 0≤X≤3.5.

In some embodiments, the micropattern of metallic conductor (e.g., traces) is darkened, for example by depositing a dark material on the metallic conductor or by forming a dark reaction product on the surface of the metallic conductor, as is known in the art. Examples of such dark materials or dark reaction products include carbon-based materials, metal sulfides, or metal oxides. In some embodiments, a micropattern of metallic conductor includes a periodic mesh. In some embodiments, the periodic mesh is formed with a bias angle, relative to the periodic pixel pattern of the underlying display, as is known in the art. In some embodiments, the micropattern of metallic conductor includes a random or pseudo-random mesh. In some embodiments, the metallic conductor of the micropattern (e.g., a micropattern of conductive metallic traces) is a composite material comprising metallic particles in a matrix that may not be metallic, for example a composite material comprising metallic particles in a polymer matrix, derived from a printable conductive ink, as is known in the art.

In some embodiments, at least a portion of the force-sensing element comprises at least one micropattern of conductive metallic traces (i.e., the "force-sensing element metallic conductor micropattern") overlaying (i.e., disposed upon) at least a portion of the viewable region of the electronic display without substantially obscuring the viewable region of the display. Without substantially obscuring the viewable region of the display means that the provided transparent insulating substrate with force-sensing element having a metallic conductor micropattern does not reduce the visible light transmission of the electronic display more than is disclosed above and that the light transmission through the electronic display is clear enough so that information displayed by the electronic device is not substantially distorted and can be read by a normal viewer (one without any significant sight loss). Viewability of the display can be affected by both visible light transmission and haze for the transparent insulating substrate with force-sensing element having a metallic conductor micropattern. Visible light transmission has been described above. Haze or light scattering can be easily measured by one of ordinary skill in the art. To be clear, the provided substrate comprising a force-sensing element can have a haze of less than about 50 percent, less than about 40 percent, less than about 30 percent, less than about 20 percent, or even less than about 10 percent.

Viewability of a display, when a transparent insulating substrate with force-sensing element having a metallic conductor micropattern is interposed between the viewer and the display element, can also be affected by the features sizes and geometry of the micropattern, relative to the sizes and geometries of the pixels of the underlying display element. For the provided transparent insulating substrates with force-sensing element having a metallic conductor micropattern, the micropattern preferably comprises metallic traces, with the minimum feature size of the micropattern (e.g., the trace widths of the micropattern) being less than half of the width of an underlying pixel (in the direction of the width of the trace), more preferably less than 10% of the width of an underlying pixel, most preferably less than 5% of the width of an underlying pixel.

Examples of useful metals for forming the at least one micropattern of conductive traces include gold, silver, palladium, platinum, aluminum, copper, nickel, molybdenum, tungsten, tin, alloys, or combinations thereof. The conductor may have a thickness of, for example, between 5 nanometers (nm) and 5 nm, or between 10 nm and 500 nm, or between 15 nm and 250 nm. In many embodiments, the thickness of the conductor is less than one micrometer. A desired thickness for the conductor can be calculated by starting with the desired sheet resistance and considering the sensing pattern geometry (and in turn its effect on the current-carrying cross-section in the plane) and the bulk resistivity of the conductor, as is known in the art. For complicated geometries of sensing patterns, there are computational methods in the art, e.g. finite difference methods or finite element methods that can be used to calculate sheet resistance, referred to herein as modeling the properties of a sensing pattern. Sheet resistance can be measured using a number of techniques, including four-point probe techniques and non-contact eddy-current methods, as are known in the art.

Micropatterns of conductive metallic traces can be generated by any appropriate patterning method, e.g. methods that include photolithography with etching or photolithography with plating (see, e.g., U.S. Pat. No. 5,126,007 (Smulovich); U.S. Pat. No. 5,492,611(Sugama et al.); U.S. Pat. No. 5,512,131 (Kumar et al.); and U.S. Pat. No. 6,775,907 (Boyko et al.)). Additionally, the micropatterns of conductive metallic traces can be created utilizing other exemplary methods such as laser cured masking (curing of a mask layer on a metal film, and then etching); inkjet printing (of masking material or of seed material for subsequent metal plating); gravure printing (of a seed material for subsequent metal plating); micro-replication (form micro-grooves in a substrate, then fill with conductive material or with a seed material for subsequent metal plating); or, micro-contact printing (stamping or rotary printing of self-assembled monolayer (SAM) patterns on a substrate's surface). Utilizing high volume, high resolution printing methods generally allow for precision placement of the conductive elements, and also allows for the (pseudo-random) variation of the conductive traces at a scale compatible with commercially available display pixels, to limit optical anomalies (for example moiré patterns) that might otherwise occur.

Certain embodiments discussed herein may employ flat-sided "wire-like" conductors that enable greater light transmission than existing sensors that utilize transparent conductors. These flat-sided "wire-like" conductors, in some embodiments, provide greater scalability and control of conductor placement than is possible with existing round wire solutions. Micro-conductors discussed herein include conductors with maximum cross sectional dimension of 10 μm or less. Less than 3 μm is typical for many sensor applications. Methods of utilizing masking and etching typically produce a low-aspect (0.05 to 0.5 μm thick×1 μm to 10 μm wide) micro-conductor. Micro-replicated grooves can produce higher aspect ratio micro-conductors, up to greater than 1:1.

Laser-cured masking can be used to create patterns of conductive traces by selectively curing a pattern with an ultraviolet laser. Such a process typically works with either film—(for example, PET) or glass-based substrates. A laser cured masking process is exemplified by
plating a substrate with metal (for example, silver or copper is sputter coated onto glass or PET film); uniformly coating a UV curable masking ink onto the plated substrate, (for example, spin coating, and dip coating); curing a portion of the printed ink with a laser to form conductive traces in the active area of the touch sensor, and may also cure (wider) lines that interconnect electrodes to connector pads (beam width of the laser may be reduced by a photo mask); removing uncured ink; and removing plated metal from the substrate by etching
except for the pattern under the masking ink.

Inkjet printing and plating of seed ink can be used to create patterns of microconductive traces by printing of a desired pattern using relatively wide lines of seed ink (catalytic ink), followed by selective curing with a UV laser, and similar to the laser cured masking process described above. The substrate for this process may be either film—(for example, PET) or glass. The inkjet printing process minimizes the amount of ink used and thus is useful when the inks are expensive (for example, seed inks). If the ink has relatively low cost, inkjet printing can be replaced by another process such as, for example, spin coating or dip coating that coats the whole substrate uniformly.

Gravure printing requires that the image to be printed is "etched" into a metal plate which rotates on a drum. As the drum turns, the etched surface is filled with ink which then gets deposited on the surface of the film being printed as the ink-filled etched plate and the film contact each other. Seed inks (or catalytic inks) may be printed by any of the methods described above. After printing and curing, the inks can be electroless plated with metals such as copper, resulting in high conductivity. Seed ink manufacturers include Conductive Inkjet Technology, a division of Carclo, located in Cambridge, UK and QinetiQ Company in Farnborough, England. Cabot Printable Electronics and Displays of Albuquerque, N. Mex. make inkjet printable silver conductive inks.

Micro-replication is yet another process that can be used to form micropatterns of conductive metallic traces. Micro-replicated channels can be filled with seed ink and then plated to make them conductive. Alternatively, the channels could be filled with an ink that by itself is conductive, eliminating the need for the plating process. A third alternative is to coat the substrate with a metal, then mask the portions of metal in the (bottom of) the grooves, then etch away the unmasked metal, (see, for example, PCT Pat. Publ. Nos. WO 2010/002679 (Stay et al.) and WO 2010/002519 (Moran et al.)). The actual shape of the channels can be altered to optimize the cross sectional shape and size that provides the lowest level of optical interference while still ensuring high conductivity and high production yields.

Filled micro-replicated channels can provide a conductor with a high aspect ratio cross section (relative to masked metal films). Thus maximum conductivity may be achieved with minimum optical visibility, (narrow cross section in the direction of viewing). A method of filling micro-replicated channels and desirable shapes of channels with high aspect ratio is described in co-assigned U. S. Pat. Publ. No. 2007/0160811 (Gaides et al.).

Micro-contact printing is yet another process that can be used to form patterns of conductive traces. Micro-contact printing is the stamping or rotary printing of self-assembled monolayer (SAM) patterns on substrate surfaces. The approach exhibits several technologically important features, including the ability to be carried out for very fine scale patterns (e.g., feature size of one tenth of a micrometer) and with the extension of the patterned monolayer to the patterning of metals, ceramics, and polymers. In an exemplary micro-contact printing process a substrate is coated with metal, (for example, silver or copper is sputter coated or plated onto glass or PET film); a self-assembled mono-layer mask is stamped onto the plated substrate; and, metal coated on the substrate is removed by etching, except for the pattern under the mask (i.e., partially etching). As is known in the art, micro-contact printing can be combined with metal deposition processes to yield an additive patterning process (for example, including electroless plating).

Typically, the force-sensing elements (micropatterns of metallic traces) can be fabricated using a printing process. They can be fabricated using a micro-contact printing process. Micro-contact printing is the patterned transfer of a self-assembled monolayer (SAM) to a substrate with a relief-patterned elastomeric stamp. The SAM can be transferred to the substrate according to the pattern of high relief for the stamp. Micro-contact printed SAM's on thin film metals can be used as etch resists. High-resolution micropatterning of the thin film metallic conductor can be possible, for example with feature sizes (e.g., trace width) of one micron or smaller. Subtractive micropatterning of thin film metals by micro-contact printing followed by etching is described in U.S. Pat. No. 5,512,131 (Kumar et al.). Micro-contact printing to form integrated passive circuit elements for sensing devices on transparent touch screen displays has been disclosed, for example, in U.S. Ser. No. 12/767,884 (Weaver et al.), filed Apr. 27, 2010.

Figure 1B:
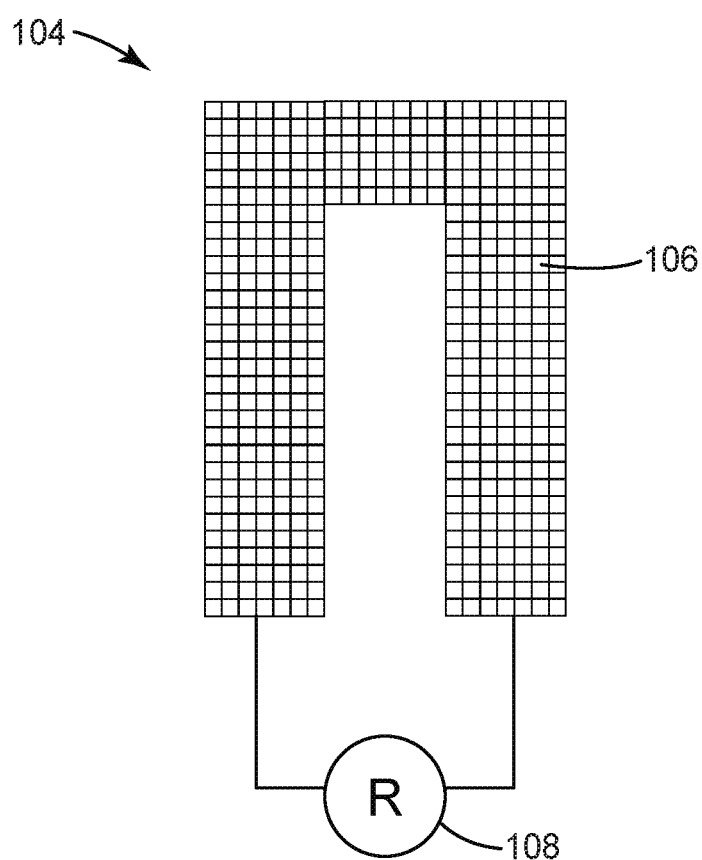

In one embodiment, the force-sensing element included in the provided article can be a lateral resistive strain gauge. FIG. 1a is a perspective view of a substrate that includes four force-sensing elements disposed upon the surface of the substrate. FIG. 1b is an exploded illustration showing one force-sensing element included on the substrate shown in FIG. 1a. In FIG. 1a, a portion of an embodied article 100 (minus the electronic display having a viewable region which is not shown) is illustrated. Article portion 100 includes transparent insulating substrate 102 having a surface which, in the illustrated embodiment, is a thick transparent slab of either glass or a transparent insulating polymer. Article 100 has four force-sensing elements 104 disposed upon the surface of substrate 102. In the illustrated embodiment, the substrate is substantially rigid, but can be deflected by the force of a touch event. The force-sensing elements are within the region of the article that, when overlaid upon (i.e., disposed upon) an electronic display device, overlays at least a portion of the viewable region of the electronic display but does not substantially obscure the viewable region of the display. In the illustrated embodiment, force-sensing elements 104 are located in the corners of the viewable portion of the display and, as shown and described in FIG. 1b, they are constructed of metallic conductive traces of micromesh which have a high open area fraction as disclosed above that enhances the viewability of electronic display devices upon which they are disposed.

In some embodiments, the touch sensor, when combined with suitable electronics, comprises a force-sensing element which also serves as a positional touch-sensing element. For example, in FIG. 1a, when a plurality of force-sensing elements 104 are integrated with substrate 102, differentials in response for the individual force-sensing elements can be used to determine the position of a touch event, in addition to the magnitude of the force of the touch event. In some embodiments, the touch sensor, when combined with suitable electronics, comprises a force-sensing element that is separate from a positional touch-sensing element. For example, a force-sensing elements 104 can be further combined with a positional touch-sensing element, for example a resistive positional touch-sensing element, such resistive positional touch-sensing elements being well-known in the art (see, for example, U.S. Pat. Publ. No. 2005/0076824 (Cross, et al.)). In one such approach, the force-sensing elements 104 may be integrated on substrate 102, with substrate 102 making up a portion of a resistive positional touch-sensing element. In this approach, the force-sensing elements 104 may be integrated on one side of a semi-rigid base sheet as substrate 102 (e.g., polycarbonate, poly(methyl methacrylate), or glass) and a conducting polymer coating may be disposed on the opposite side, the conducting polymer coating constituting the bottom (for example) conductive layer of a air-gap-separated resistive positional touch-sensing element, as are known in the art. Also for example, a force sensing element 104 can be further combined with a surface capacitive positional touch-sensing element, such surface capacitive positional touch-sensing elements being well-known in the art (see for example, U.S. Pat. No. 6,549,193 (Huang, et al.)). Finally, for example, a force sensing element 104 can be further combined with a projected capacitive positional touch-sensing element, such projected capacitive positional touch-sensing elements being well-known in the art (see, for example, U.S. Pat. Pub. No. 2005/0083307 (Aufderheide, et al.)).

FIG. 1b is an exploded view of one of the force-sensing elements shown in FIG. 1a. Force-sensing element 104 is a lateral resistive strain gauge sensing element and includes micropattern of metallic traces (referred to herein as "micromesh") 106 that includes a U-shaped grid or micromesh of conductive metallic traces. The ends of micropattern 106 are in electrical communication with resistance-measuring device 108. The resistance of force-sensing element 104 changes as the micropattern is strained. For example, the resistance of force-sensing element 104 increases as the element is stretched in its long-axis direction (hence acting as a strain gauge), as will be caused by bending (or deflecting) the substrate with an arc that lies along the direction of the long axis of the element when the element resides on the outside (convex) surface of the deflected substrate. Such an effect can be created when the force-sensing element 104 resides on the underside of the rigid substrate, relative to the touch surface that faces the user. In the embodied article of FIG. 1a, the combination of four force-sensing elements located in the corners of substantially rectangular substrate 102 can detect deflection of the substrate, for example, by a touch event, and the amount of force and location of the force from the touch event. The location and magnitude of force of a touch event can be determined by measuring resistance change for all four elements and comparing the measured changes with resistance changes associated with known locations and magnitudes of touch force that have been recorded in a calibration procedure. The measurement of resistance is known to those of ordinary skill in the art. The use of a calibration procedure to establish the relationship between position of a touch event and the response of multiple sensing elements is known to those of ordinary skill in the touch display art, for example the surface capacitive touch display art, the acoustic pulse recognition touch display art, or the force-based touch display art.

In another aspect, a touch sensor is provided that includes a transparent, insulating substrate having a surface, a transparent force-sensing element (e.g., a force-sensing element disposed within the viewable area of an electronic display when the sensor is combined with the electronic display in order to form a touch screen electronic display), wherein the force-sensing element comprises a primary micropattern of metallic traces disposed on the surface of the substrate, a counter electrode that is transparent and spaced apart from the primary micropattern of metallic traces, and a pressure-responsive material interposed between, and in some embodiments directly adjacent to, the micropattern of metallic traces and the counter electrode (referred to herein as a "two-layer force-sensing touch sensor"). The primary micropattern of metallic traces has the geometry of a mesh and has an open area fraction of between 80 percent and 99.75 percent. In some other embodiments, the open area fraction of the primary micropattern of metallic traces of the force-sensing element can be between 90 and 99.5 percent. In other embodiments, the open area fraction of the primary micropattern of metallic traces of the force-sensing element can be between 95 and 99 percent. In some embodiments, the primary micropattern of metallic traces has a conductor trace with of about [X+0.5] in units of micrometers (μm); and an open area fraction between about [95−X] % and 99.5%, where 0≤X≤4.5. In some other embodiments, the primary micropattern of metallic traces has an open area fraction of between about [98.5−(2.5X÷3.5)] % and [99.5−(X÷3.5)] % wherein 0≤X≤3.5. The primary micropattern of metallic traces includes features having minimum dimension of between 0.5 and 20 μm. In other embodiments, the minimum dimension of features of the primary micropattern of metallic traces of the force-sensing element is between 1 and 5 μm.

In some embodiments, the minimum dimension of features of the primary micropattern of metallic traces of the force-sensing element is between 1.5 and 4 μm. By minimum dimension of a feature, what is meant is that the smallest dimension that can be measured for a feature the primary micropattern of metallic traces. For example, for a micropattern consisting of linear conductive traces, the minimum dimension is the width of the traces (or the width of the narrowest trace or traces). The counter electrode may be a secondary micropattern of conductive traces according to the entire preceding description of the primary micropattern of conductive traces. Alternatively, the counter electrode may comprise transparent conducting oxide (e.g., indium tin oxide), or it may comprise a conducting polymer (e.g., poly(3,4-ethylenedioxythiophene)-polystyrene sulfonate (PEDOT-PSS)). The pressure-responsive material may be, for example, a piezoelectric material that develops polarization in response to an applied pressure, a piezoresistive material that exhibits a change in bulk conductivity in response to an applied pressure, or a low-modulus insulating or even compressible insulating material that is easily deformed under the application of, for example, localized uniaxial pressure. The latter low-modulus or compressible material, when interposed between a primary micropattern of metallic traces and a counter electrode, is referred to herein as a pressure-responsive material in the form of a deformable dielectric. Examples of deformable dielectrics include materials in the form of open-cell foams, gels, and uncrosslinked or lightly crosslinked polymers (for example polyurethanes or silicones). Such materials may exhibit an elastic modulus of less than 10 MPa, less than 5 MPa, less than 2 MPa, or even less than 1 MPa. In some embodiments, the deformable dielectric material exhibits an elastic modulus between 0.05 and 5 MPa. In some embodiments, the deformable dielectric material exhibits an elastic modulus between 0.1 and 1 MPa. Other examples of a pressure-responsive material in the form of a deformable dielectrics include patterned insulating materials separated by air (e.g., ink-jet printed dot patterns) or structured insulating materials (e.g., corrugated) with air pockets (e.g., corrugated polymer films formed by embossing). The counter electrode is preferably disposed on the surface of a second transparent insulating substrate. Typically, the transparent insulating substrate having the primary micropattern of metallic traces can be oriented toward the touch sensor (or touch display) user, relative to the position of the counter electrode and the second transparent insulating substrate. In this aspect, a touch sensor is provided with a flexible transparent insulating substrate of planar form with two major surfaces, the first surface oriented toward the sensor user (referred to herein as the top of the construction) and the second surface having the primary micropattern of conductive traces disposed thereon, a layer of pressure-responsive material below the primary micropattern of conducive traces in the form or a mesh, the counter electrode in a planar form (e.g., a secondary micropattern of conductive traces in the form of a mesh or a coating of transparent conducting oxide material), and a second transparent insulating substrate that is preferably more rigid than the aforementioned flexible transparent insulating substrate. Preferably, the flexible transparent insulating substrate is thinner than the second transparent insulating substrate. Typically, the flexible transparent insulating substrate is less than 150 μm in thickness, more typically less than 100 μm in thickness. The second transparent insulating substrate can be greater than 150 μm in thickness, at least 250 μm in thickness, or even at least 500 μm in thickness (e.g., 1 mm, 1.5 mm, 2 mm). The flexible transparent insulating substrate can be a polymer film, such as, for example, a film comprising poly(ethylene terephthalate) (PET), poly(ethylene naphthalate) (PEN), poly(methylmethacrylate) (PMMA), or polycarbonate. The flexible transparent insulating substrate may be a thin glass sheet (e.g., 100 μm thick, or less). The second transparent insulating substrate may be a polymer sheet or a glass sheet, for example poly(ethylene terephthalate) (PET), poly(ethylene naphthalate) (PEN), poly(methylmethacrylate) (PMMA), polycarbonate, or soda-lime-silica glass.

In some aspects of two-layer force-sensing touch sensors, a touch screen display sensor (a touch sensor) is provided for combination with an electronic display having a viewable region, the sensor including a transparent insulating substrate having a surface and a force-sensing element disposed on the surface. The force-sensing element can comprise two sets of bands of micropatterns of micromesh and each band of micromesh can include traces of a metallic conductor. The force-sensing element and the touch-sensing element can overlay at least a portion of the viewable region of the display without substantially obscuring the viewable region of the display. Each band of micromesh can be transparent. The force-sensing element can be transparent. The force sensing element, if combined with suitable electronics, may also serve as a positional touch-sensing element, alternatively, the force sensing element can be combined with a separate positional touch-sensing element (e.g., a resistive positional touch-sensing element, a surface-capacitive positional touch-sensing element, or a projected capacitive positional touch-sensing element, as already described).

The force-sensing element in the provided touch screen display sensors can include pressure-responsive material elements such as piezoresistive, piezoelectric, or capacitive sensing elements. Piezoresistive sensing elements measure the change in electrical resistance of a material due to applied mechanical stress. The piezoresistive sensing element can include a piezoresistive material. Examples of piezoresistive materials include semiconductor materials such as germanium, polycrystalline silicon, amorphous silicon, silicon carbide, and single crystal silicon. In some embodiments, piezoresistive materials can include conductive particles in a matrix, for example an insulating matrix. The conductive particles can include conductors or semiconductors that are transparent. In one embodiment, the piezoresistive material comprises particles of indium tin oxide (ITO), antimony-doped tin oxide (ATO), aluminum-doped zinc oxide (AZO), or other transparent conducting oxide, dispersed in an insulating, transparent, deformable matrix. In some embodiments, the matrix can include polymeric materials such as acrylic adhesives, silicones, polyurethanes, or fluoroelastomers such as polyvinylidene fluoride or any of its co-polymer or ter-polymers with hexafluoropropylene (HFP) or tetrafluoroethylene (TFE) for example. Other examples of useful piezoresistive materials as pressure-responsive materials in two-layer force-sensing elements include composites comprising an insulating matrix and a conductive filament, for example a carbon nanotube or a metal nanowire (e.g., silver, gold). Useful metal nanowires and composites made therefrom are described in U.S. Pat. Publ. No. 2008/0259262 (Jones et al.). Such composites can be transparent and such filaments can be invisible to the unaided eye. The force-sensing element and the touch-sensing element in the provided touch screen display can have any of the features described above for the article having an electronic display with a viewable region.

Piezoelectric sensing elements can include piezoelectric materials. Piezoelectric sensing materials use the "piezoelectric effect" to convert mechanical impulses or mechanical or acoustical vibrations into electrical polarization or an electrical signal. In some embodiments, the piezoelectric materials include polarized molecules or domains that can align themselves with an electric field (i.e,. ferroelectric) and cause the material to change dimension. Examples of piezoelectric materials include quartz, barium titanate, or lead zirconate titanate (PZT). Other examples of piezoelectric materials include polyvinylidene fluoride and related compositions. In some embodiments, the piezoelectric material used for the force-sensing element can include a polymer such as, for example, polyvinylidene fluoride (PVDF) or its derivatives, for example irradiated PVDF or co-polymers of PVDF with other monomers (HFP or TFE). A piezoelectric polymer is preferred over a piezoelectric ceramic in the current application, due to its ease of processing, flexibility, and optical properties (index of refraction, clarity, haze).

Two-layer force-sensing touch sensors can include additional materials interposed between the primary micropattern of metallic traces and the pressure-responsive material, or between the counter electrode and the pressure responsive-material. Inclusion of an additional material between the primary micropattern of metallic traces can be useful for mitigating any unfavorable interactions between the micropattern of metallic traces and the pressure-responsive material. An example of an unfavorable interaction would be mechanical damage of the micropattern of metallic traces by a hard conductive filler particle (e.g., ITO). An example of a useful additional material that may be interposed between the primary micropattern of metallic traces and the pressure-responsive material or between the counter electrode and the pressure responsive-material is a conductive polymer (e.g., PEDOT-PSS, polyaniline, or polyphenylene vinylene).

Figure 2A:
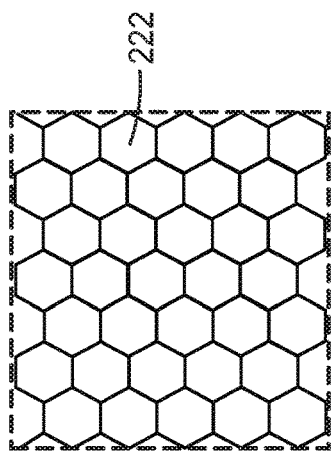
FIG. 2A is an exploded view of a portion (220) of the provided tough screen display sensor of FIG. 2.
Figure 2:
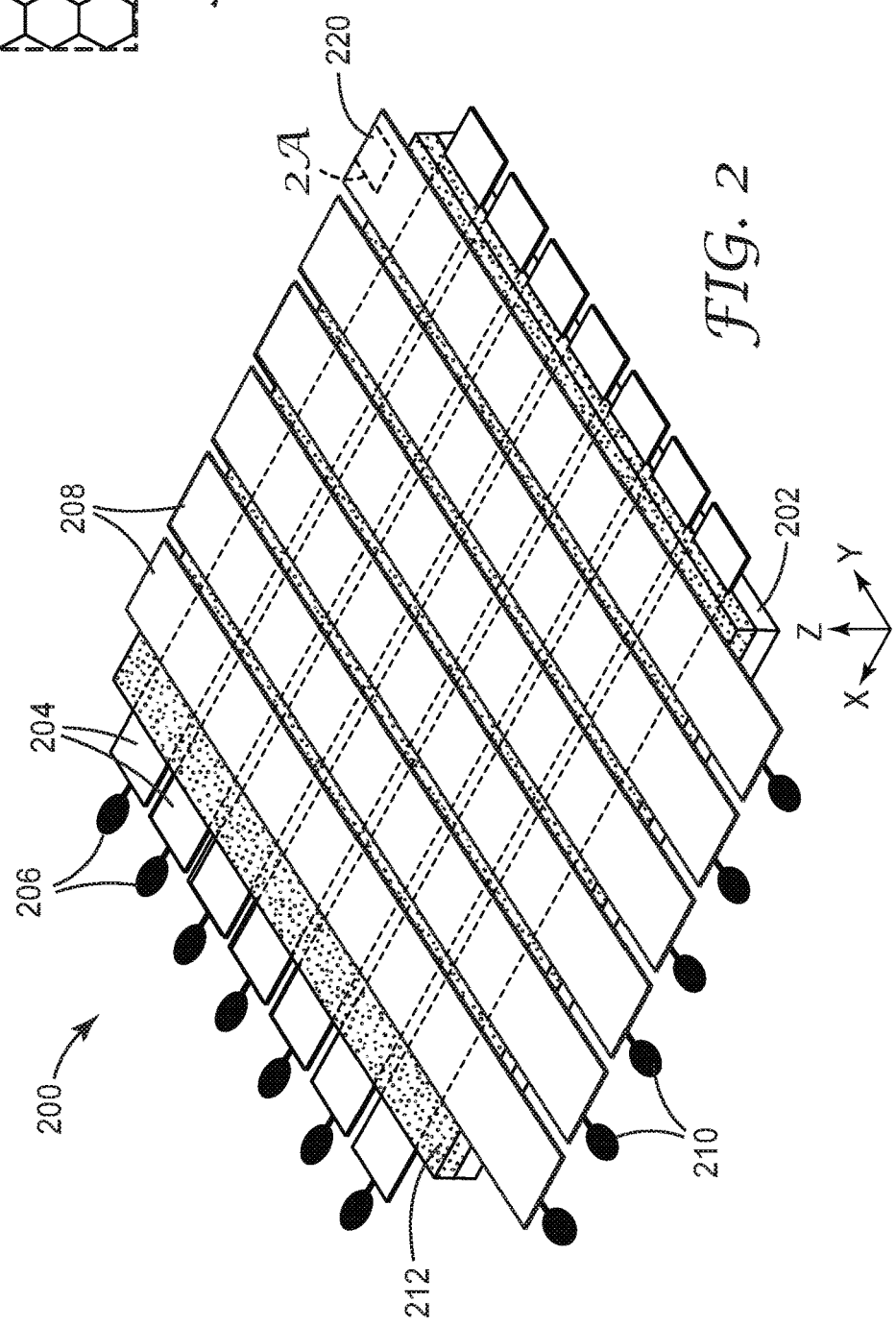
FIG. 2 is a perspective view of a portion of an embodiment of the provided touch screen display sensor.

FIG. 2 is a perspective view of a portion of an embodiment of the provided touch screen display sensor (touch sensor). FIG. 2 illustrates touch screen display sensor 200. Touch screen display sensor 200 includes transparent substrate 202. Transparent substrate 202 can be rigid and, in some embodiments, can be a part of an electronic display device. Typically transparent substrate 202 can be glass or a clear polymer slab such as, for example, poly(methyl methacrylate), polystyrene, or polycarbonate. Disposed upon transparent rigid substrate 202 is one set of substantially parallel bands of micromesh 204. Each band of micromesh is attached to a separate electrode 206. A second set of substantially parallel bands of micromesh 208 is aligned substantially perpendicular to the first set of bands of substantially parallel bands of micromesh 204 and each of these bands is attached to a separate electrode 210. Each band of micromesh includes an array of metallic traces (shown in the exploded view 222) that have a large fraction of wide open spaces. The two sets of bands are separated in the z-direction by pressure-responsive material 212 that includes at least one of a piezoresistive material, a piezoelectric material, a resistive material, or a capacitive insulating material (pressure-responsive materials). The general configuration shown in FIG. 2 can include any of the listed materials. Useful materials to separate the two set of bands can include, for example, anisotropic adhesives that are well known to those of ordinary skill in the art.

Figure 3A:
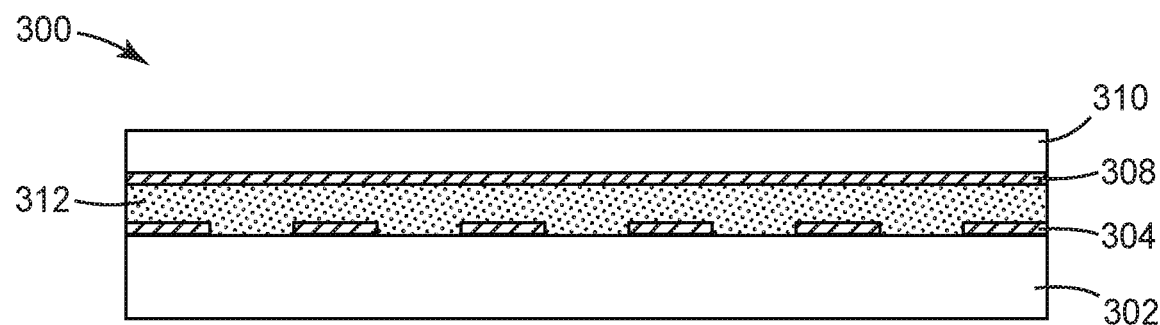
FIGS. 3a and 3b are side views of a provided touch screen display sensor.
Figure 3B:
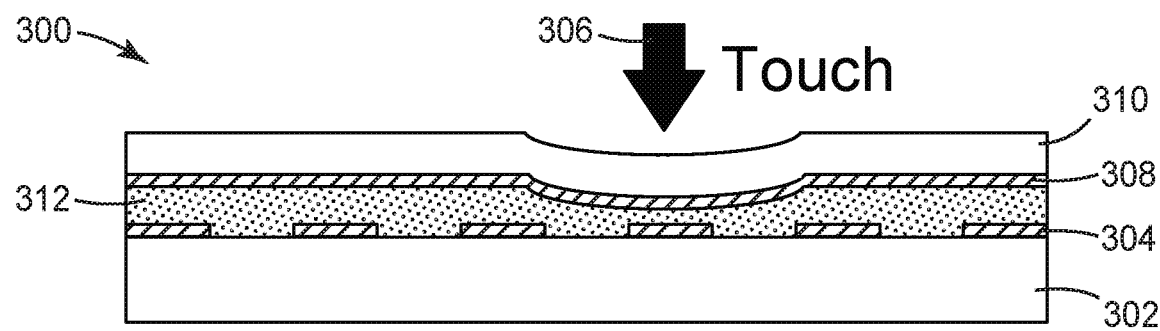

FIGS. 3a and 3b are side views of provided touch screen display sensor 300. FIG. 3a is an illustration of the native sensor (no applied force). Sensor 300 includes rigid transparent substrate 302 that can be a top layer of a display of an electronic device. A first set of substantially parallel bands of micromesh 304 are disposed upon rigid substrate 302. Each band is attached to an individual electrode (not shown). A layer of piezoresistive, piezoelectric, resistive, or capacitive material 312 is disposed upon the first set of substantially parallel bands of micromesh 304. A second set of substantially parallel bands of micromesh 308 is separated by layer 312 and is oriented orthogonally but in a substantially parallel plane to the plane of the first set of substantially parallel bands of micromesh 304. In some embodiments, each band of micromesh from the first set crosses each band of micromesh from the second set of bands, spaced apart in the z-direction, forming a two-dimensional array of force-sensing elements. A flexible transparent insulating substrate 310 lies above the second set of substantially parallel bands of micromesh.

FIG. 3b displays the same sensor illustrated in FIG. 3a except that a force (such as a touch force) has been applied to flexible insulating substrate 310 compressing the material where one or more of the two sets of bands cross. As can be seen in FIG. 3b, in the region below the compression, the first band of micromesh 304 and the second band of micromesh 308 directly under the compression site have resistive, capacitive, or other pressure-responsive sensing material that has been deformed. By electrically monitoring each of the force-sensing elements in the array, the amount of force and the location of that amount of force over the entire area covered by the bands of micromesh can be measured. Accordingly, a sensor of the present description (with piezoresistive, piezoelectric, or deformable dielectric material or structure interposed between orthogonal sets of bands of light-transmitting micromesh) can measure the amount of force and the location of that amount of force for multiple touches of localized applications of force (for example two touches, three touches, four touches, or even as many as 5, 10, or 20 touches). That is, the sensor of the present description is a positional multi-touch sensor. It can also be described as an all-points addressable or imaging sensor.

In some embodiments, at least a portion of a metallic conductor micropattern that is used at one time as at least a part of a positional touch-sensing element can be used at another time as at least a part of a force-sensing element. In such embodiments, electronics are used that can make the necessary measurement or measurements using the bands of micropatterns for positional touch-sensing and that can make the necessary measurement or measurements for force-sensing, sequentially. In other embodiments, at least a portion of a metallic conductor micropattern that can be used as part of a positional touch-sensing element can be used at the same time as at least a part of a force-sensing element. In such embodiments, electronics are used that can make the necessary measurement or measurements for positional touch-sensing and the necessary measurement or measurements for force-sensing, simultaneously.

To further describe the positional relationship between the force-sensing element metallic conductor micropattern and the positional touch-sensing metallic conductor micropattern, it is sometimes useful to describe the relative positions of the micropatterns in the plane of the display (or as projected into the plane of the display; or stated differently, as viewed by a display user who views the display at a normal angle or near-normal angle to the plane of the display). This latter aspect of relative position between the force-sensing micropattern and the positional touch-sensing micropattern is referred to herein as the in-plane relative position. In some embodiments, the in-plane relative position between at least a portion of the force-sensing element metallic conductor micropattern and at least a portion of the positional touch-sensing metallic conductor micropattern is such that the open area of a region (e.g., 4 mm$^2$ region, 10 mm$^2$ region, or 100 mm$^2$ region) comprising the portion of the force-sensing element metallic conductor micropattern and the portion of the positional touch-sensing metallic conductor micropattern has an open area of between 0.80 and 0.9975 (i.e., between 80 percent and 99.75 percent). In some preferred embodiments, the open area fraction of the metallic conductor micropattern of the force-sensing element is between 0.90 and 0.995). In some more preferred embodiments, the open area fraction of the metallic conductor micropattern of the force-sensing element is between 0.95 and 0.99.

Measurements with a conductive metallic micropattern that lead to positional touch-sensing are described in disclosures referenced herein. Measurements with a conductor micropattern that lead to force-sensing include, for example: i) changes in electrical resistance of the conductor micropattern; ii) changes in electrical resistance for a material adjacent to or interposed between one or more portions of one or more conductor micropatterns; iii) changes in capacitance between one or more portions of one or more conductor micropatterns, vs. their environment ("self-capacitance" or vs. a counterelectrode (i.e., mutual capacitance)); and iv) changes in polarization (charge) between one or more portions of one or more conductor micropatterns, vs. a counterelectrode (as created by a piezoelectric material interposed between the one or more portions of the one or more conductor micropatterns and the counterelectrode).

The measurement of a change in electrical resistance of the conductor micropattern in response to force applied to the sensor and including a strain response for the micropattern (i.e., wherein the applied force causes a deformation of the conductor micropattern) constitutes the use of the micropattern as a resistive strain gauge. In preferred embodiments, the force-sensing metallic conductor micropattern is integrated on or in a transparent substrate of the sensor as a pattern of conductor material on or in the transparent substrate. By integrated, what is meant is that the pattern of conductor material is directly on or adjacent the substrate surface (i.e., not a portion of a discrete strain gauge component that is mounted, for example with solder or conductive adhesive). Other examples of suitable micropatterns of metallic traces include serpentine conductive paths for a single microtrace or for a micromesh. Serpentine paths of conductive material, useful as resistive strain gauge elements, are known in the art (see, for example, PCT Pat. Publ. No. WO94/02921 (Young).

The provided article can further comprise a transparent positional touch-sensing element that is suitable for overlaying an electronic display display. The touch-sensing element can include means for locating the position or positions of one or more touch or near-touch ("proximity") events. The means for locating the position or positions of one or more touch or near-touch events may be based on optical, visual, or electrical detection. Optical detection means may include for example edge-mounted infrared camera (one-dimensional) systems, as described in U.S. Pat. Publ. No. 2010/0045629 (Newton). Visual detection means may include two-dimensional imaging cameras and image analysis, for example as described in U.S. Pat. Publ. No. 2009/0278799 (Wilson). Electrical detection means may include a resistive touch sensor, for example as described in U.S. Pat. No. 3,662,105 (Hurst et al.). Electrical detection means may include surface capacitive touch sensor, for example as described in U.S. Pat. Nos. 6,549,193 and 6,781,579 (both Huang et al.). Typically, the electrical detection means includes a projected capacitive touch sensor, for example as described in U.S. Pat. Publ. No. 2009/0219257 (Frey et al.).

Touch screen display sensors according to the present disclosure are typically fabricated using microcontact printing processes. Microcontact printing includes the contact transfer of functionalizing molecules from an elastomeric stamp to a substrate selected to bind the functionalizing molecules, for example in the form of a self-assembled monolayer (SAM). Microcontact printing processes are described generally in U.S. Pat. No. 5,512,131 (Kumar et al.). Microcontact printed self-assembled monolayers are useful as patterned etch masks. As an etch mask applied to a thin metal film for example on an insulating substrate (e.g., polymer film, glass, or ceramic substrate), the self-assembled monolayer allows for etch patterning of the metal film according to the pattern of the SAM. Although the fabrication of sensors described herein advantageously include a microcontact printing step, the sensors described herein are not limited in any way to such a method of fabrication. Any method of fabrication that is capable of yielding the described patterns, micropatterns, components, force-sensing elements, or sensing regions may be used. Useful conductor patterns according to the present disclosure can also be fabricated using processes based on photolithography. Although not necessarily readily achievable, useful conductor patterns according to the present disclosure may also be fabricated using flexographic printing, offset gravure printing, or other methods based on patterning conductive materials by inlaying into microstructured substrates, for example as described in PCT Pat. Publ. Nos. WO2010/002519 (Moran et al.) or WO2010/002679 (Stay et al.).

The provided force sensors and displays including the force sensors are useful for forming a touch user interface with improved characteristics over those of existing touch displays. In particular, the provided force sensors and displays including the force sensors have the ability to a register force value together with touch location for one or more touches (i.e., multi-touch force-measuring sensors and multi-touch force-measuring touch displays). Relative to traditional resistive or surface capacitive touch sensors or displays (inherently single touch), the provided sensors and displays can resolve multiple touch locations and also provide for measurement of touch force. Relative to previous matrix-type mutual capacitive sensors assembled under a rigid cover sheet (e.g., glass or polycarbonate), the provided sensors and displays provide for the measurement of forces of multiple touches, not just locations. Relative to previous matrix-type mutual capacitive, piezoresistive, or piezoelectric force-measuring touch sensors or displays based on transparent conducting oxide (e.g., indium tin oxide, ITO) electrodes, the provided sensors and displays provide a more robust material construction that is less prone to cracking and degradation of performance with use. Relative to previous force-measuring touch panels that register the location of a touch event, the provided sensors and displays include micropatterned metallic conductor as part of sensing elements that can be overlaid with the viewable area of a display, thereby avoiding the need to place bulky force sensors outside the viewable area, which undesirably increases the overall size of the device that includes the touch display. The creation of a robust, durable, non-display-obscuring, display-overlaid, multi-touch, force-measuring sensor element or sensor elements allows for the design and manufacture of electronic devices having a wider range of input data. For example, gaming devices, industrial equipment controls, or a computer graphical user interfaces can be made more user-friendly and powerful when the above-described capabilities and features are included.

Objects and advantages of this invention are further illustrated by the following examples, but the particular materials and amounts thereof recited in these examples, as well as other conditions and details, should not be construed to unduly limit this invention.

EXAMPLES (ALL PROPHETIC)

First Patterned Substrate

A first visible light substrate made of polyethylene terephthalate (PET) having a thickness of 125 micrometers (μm) is vapor coated with 100 nm silver thin film using a thermal evaporative coater to yield a first silver metalized film. The PET is available as product number ST504 from E.I. du Pont de Nemours, Wilmington, Del. The silver is available from Cerac Inc., Milwaukee, Wis. as 99.99% pure 3 mm shot.

A first poly(dimethylsiloxane) stamp, referred to as PDMS and available as SYLGARD 184, Dow Chemical Co., Midland, Mich., having a thickness of 3 mm, is molded against a 10 cm diameter silicon wafer (sometimes referred to in the industry as a "master") that has previously been patterned using standard photolithography techniques. The PDMS is cured on the silicon wafer at 65° C. for 2 hours. Thereafter, the PDMS is peeled away from the wafer to yield a first stamp having two different low-density regions with patterns of raised features, a first continuous hexagonal mesh pattern (mesh bands) and a second discontinuous hexagonal mesh pattern. The raised features define the edges of edge-sharing hexagons. A discontinuous hexagon is one that contains selective breaks in a line segment. The selective breaks have a length less than 10 μm. The breaks are designed to be approximately 5 μm. In order to reduce their visibility, preferably, the breaks should be less than 10 μm, or even 5 μm or less, or between 1 and 5 μm. Each raised hexagon outline pattern has a height of 2 μm, has 1% to 3% area coverage, corresponding to 97% to 99% open area, and line segments of 2 μm to 3 μm in width. The first stamp also includes raised features defining 500 μm wide interconnect traces. The first stamp has a first structured side that has the hexagonal mesh pattern regions and the interconnect trace features and an opposing second substantially flat side.

The first patterned substrate is prepared by microcontact printing, as follows. The stamp is placed, structured side up, in a glass Petri dish containing 2 mm diameter glass beads. Thus, the second, substantially flat side is in direct contact with the glass beads. The beads serve to lift the stamp away from the base of the dish, allowing the following ink solution to contact essentially all of the flat side of the stamp. A 10 mM ink solution of 1-octadecanethiol (available from TCI America, Portland Oreg.) in ethanol is pipetted into the Petri dish beneath the stamp. The ink solution is in direct contact with the second substantially flat side of the stamp. After sufficient inking time (e.g., 3 h) where the ink has diffused into the stamp, the first stamp is removed from the petri dish. The inked stamp is placed, structured side up, onto a working surface. The first silver metalized film is applied using a hand-held roller onto the inked structured surface of the stamp such that the silver film is in direct contact with the structured surface. The metalized film remains on the inked stamp for 15 s. Then the first metalized film is removed from the inked stamp. The removed film is placed for three minutes into a silver etchant solution, which contains (i) 0.030 molar thiourea (Sigma-Aldrich, St. Louis, Mo.) and (ii) 0.020 molar ferric nitrate (Sigma-Aldrich) in deionized water. After the etching step, the resulting first substrate is rinsed with deionized water and dried with nitrogen gas to yield a first patterned surface. Where the inked stamp made contact with the silver of the first metalized substrate, the silver remains after etching. Thus silver is removed from the locations where contact is not made between the inked stamp and silver film.

FIGS. 4, 4a and 4b show a first patterned substrate 400 having a plurality of first mesh bands 402 alternating between a plurality of first discontinuous regions 404 on a first side of the substrate, which is the side that contains the etched and patterned silver metalized film (viewed from the front side of the film substrate; i.e., viewed from the side on which the etched and patterned silver metal is disposed). The first patterned substrate comprises a micropattern of conductive traces, the micropattern comprising the mesh bands and the discontinuous regions. The mesh bands measure 3 mm in width and are spaced apart by 3 mm. The substrate has an opposing second side that is substantially bare PET film. Each of the first mesh bands 402 has a corresponding 500 μm wide conductive interconnect trace 406 disposed at one end. FIG. 4a shows an exploded view of the first mesh band 402 having a plurality of continuous lines forming a hexagonal mesh structure. FIG. 4b shows an exploded view of the first discontinuous region 404 having a plurality of discontinuous lines (shown as selective breaks in each hexagon) forming a discontinuous hexagonal mesh structure. Each mesh structure of mesh bands 402 and discontinuous regions 404 has 97% to 99% open area. Each line segment is from 2 to 3 μm in width.

Second Patterned Substrate

The second patterned substrate is made by microcontact printing, similarly to the first patterned substrate, using a second visible light substrate to produce a second silver metalized film. A second stamp is produced having a second continuous hexagonal mesh pattern (mesh bands) interposed between a second discontinuous hexagonal mesh pattern.

Figure 5:
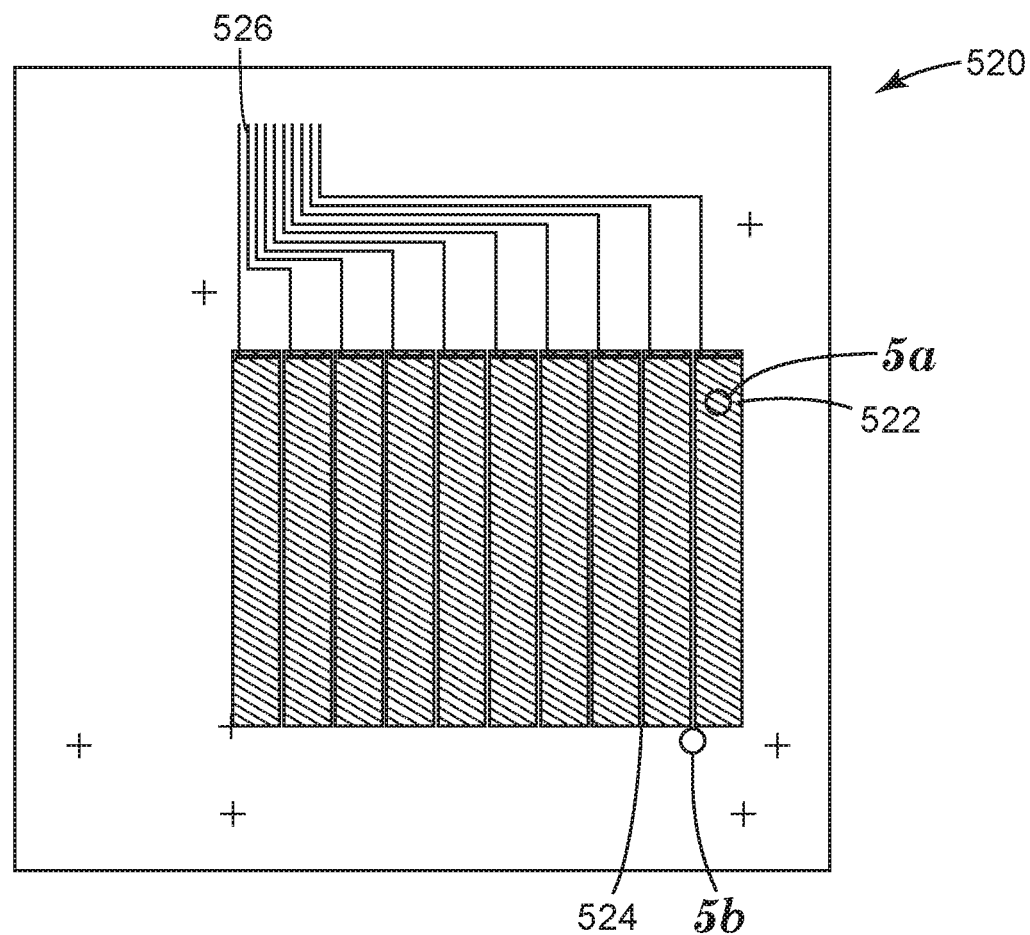
FIGS. 5, 5a, and 5b are schematic illustrations of an embodiment of a provided article.
Figure 5A:
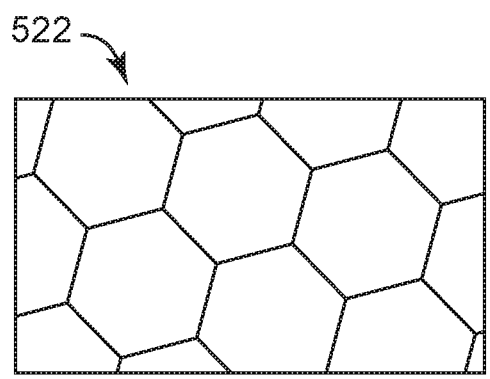
Figure 5B:
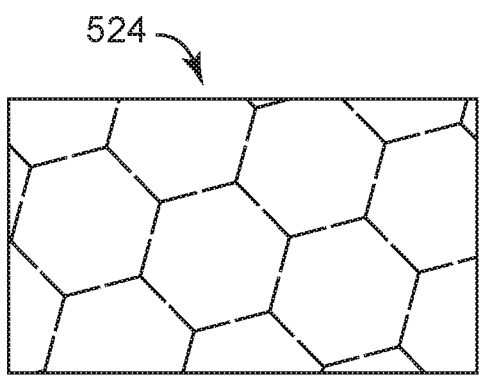

FIGS. 5, 5a and 5b show a second patterned substrate 520 having a plurality of second mesh bands 522 alternating between a plurality of second discontinuous regions 524 on a first side of the second substrate (viewed through the film substrate from the back side; i.e., viewed from the side opposite that on which the etched and patterned silver metal is disposed). The second patterned substrate comprises a micropattern of conductive traces, the micropattern comprising the mesh bands and discontinuous regions. The mesh bands measure 5.5 mm in width and they are spaced by 0.5 mm. Each of the second mesh bands 522 has a corresponding 500 μm wide second conductive interconnect trace 526 disposed at one end. FIG. 5a shows an exploded view of one second mesh band 522 having a plurality of continuous lines forming a hexagonal mesh structure. FIG. 5b shows an exploded view of one second discontinuous region 524 having a plurality of discontinuous lines (shown as selective breaks in each hexagon) forming discontinuous hexagonal mesh structure. The selective breaks have a length less than 10 µm. The breaks are designed to be approximately 5 µm. In order to reduce their visibility, preferably, the breaks should be less than 10 µm, 5 µm or less, or between 1 and 5 µm. Each mesh structure of mesh bands 522 and each discontinuous region 524 has 97% to 99% open area. Each line segment is from 2 µm to 3 µm in width.

Example 1

Formation of a Display with a Touch Sensor having Piezoresistive Pressure-Responsive Material The first and second patterned substrates made above are used to produce a two-layer force-sensing touch sensor as follows, which includes a piezoresistive pressure-responsive material. The pressure-responsive material is interposed between the first and second patterned substrates, with the patterned surface (having a micropattern of conductive traces) of each substrate facing the pressure responsive material. The pressure-responsive material is a composite of transparent conductive particles dispersed in a matrix. The film derived from the electroconductive ITO ink in Example 1 of U.S. Pat. No. 5,763,091 (Kawata, et al.) is used as the pressure-responsive material. The film may be coated onto the micropattern of conductive traces of the first pattern substrate. The film is coated selectively on the substrate surface so as to cover the first bands and the first discontinuous regions, but so as not to cover the terminations of interconnect traces 406 in FIG. 4. Next, the second patterned substrate is laminated with application of pressure to the surface of the pressure-responsive material, yielding a touch sensor according to FIG. 6 (approximately 40 mm by 60 mm sensing area). The orientation of the second patterned substrate is such that its micropattern of conductive traces faces the pressure responsive material. The film coating using electroconductive ITO ink and the lamination are carried out in such a way that the terminations of interconnect traces 606 and 626 are not covered with the film, allowing electrical contact to be made to the terminations of the interconnect traces.

Figure 6:
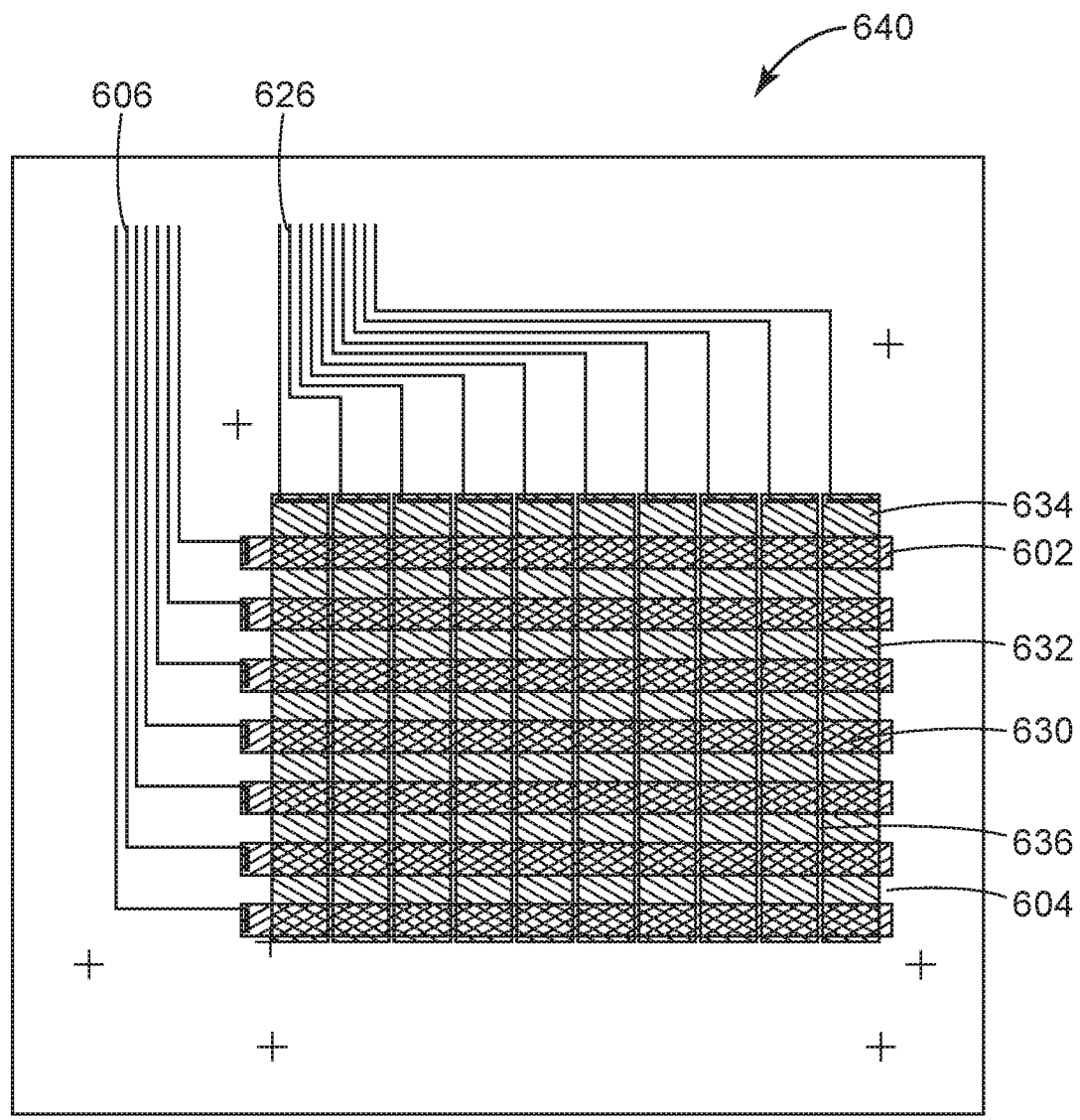
FIG. 6 is a schematic illustration of a touch sensor useful in a provided touch screen display.

The described two-layer force-sensing touch sensor can be connected to electronics (at the terminations of interconnect traces 606 and 626) designed to probe the resistance between the first patterned substrate and the second patterned substrate, successively at each region of intersection 630. FIG. 6 shows a top plan view of the touch screen sensor element 640 where the first and second patterned substrate have been laminated. Region 630 represents the overlap of the first mesh bands and second mesh bands. Region 632 represents the overlap of the first mesh bands and the second discontinuous region. Region 634 represents the overlap of the second mesh bands and the first discontinuous region. And, region 636 represents the overlap between the first and second discontinuous regions. While there is a plurality of these overlap regions, for ease of illustration, only one region of each has been depicted in the figure. Measurement of resistance with electronics can be carried out by any suitable method in the art. Measurements of resistance for each region of overlap 630 allows for the detection and mapping of changes in resistance across the sensor, as caused by localized pressure (i.e., touch pressure) being applied to the pressure-responsive material in the form of a piezoresistive material. Hence, the above described touch sensor can be used as a positional touch sensor, and the two patterned substrates with micropatterns of conductive traces, together with the piezoresistive pressure-responsive material interposed, represent a positional touch-sensing element. As increasing pressure is applied, resistance is progressively reduced across the pressure-responsive piezoresistive material, due to increased contact between conductive particles. Hence the above described touch sensor can be combined with electronics to yield a force-sensing touch sensor system. The above described touch sensor can be used as a force touch sensor, and the two patterned substrates with micropatterns of conductive traces, together with the piezoresistive pressure-responsive material interposed, represent a force-sensing element. The above described touch sensor is further laminated to a base sheet of 1 mm thick polycarbonate. The sensor is laminated with the back side of its second patterned substrate (i.e., major surface without the micropattern of conductive traced disposed thereon) facing the base sheet. Other suitable base sheets are poly(methyl methacrylate) or glass (e.g., 1 mm thick). The sensor is laminated to the base sheet using Optically Clear Laminating Adhesive 8172 from 3M Company, St. Paul, Minn. to yield a multilayer construction. The above described touch sensor laminated to a base sheet is overlaid and mounted to the front a liquid crystal display (LCD) with a 30 mm by 41 mm viewable region (i.e., an electronic display, available as ANDpSi025TD-LED-KIT from Purdy Electronics Corporation, Sunnyvale, Calif.). The touch sensor is mounted with its base sheet facing the display. The regions of intersection 630 of the touch sensor overlay the viewable region of the electronic display (i.e., the regions of intersection 630 are disposed within the viewable region of the electronic display).

Example 2

Formation of a Display with a Touch Sensor having Piezoresistive Pressure-Responsive Material The first and second patterned substrates made above can be used to produce a two-layer force-sensing touch sensor as follows, which includes a piezoresistive pressure-responsive material. A pressure-responsive material can be interposed between the first and second patterned substrate, with the patterned surface (having a micropattern of conductive traces) of each substrate facing the pressure-responsive material. The pressure-responsive material is a multilayer of the following material components in sequence i) first conductive polymer layer, ii) a composite layer of transparent conductive particles dispersed in a matrix, and iii) second conductive polymer layer. The first conductive polymer layer and the second conductive polymer layer have the same composition and thickness. The film derived from the electroconductive ITO ink in Example 1 of U.S. Pat. No. 5,763,091 (Kawata, et al.) is used as the composite of transparent conductive particles dispersed in a matrix. Coatings of PEDOT-PSS (CLEVIO PH 1000, available from H. C. Starck, Newton, Mass.) are used as the first and second conductive polymer layers. The first conductive polymer layer is coated onto the micropattern of conductive traces of the first pattern substrate. The first conductive polymer is coated onto the first patterned substrate according to the polymer manufacturer specifications so as to cover the first bands and the first discontinuous regions, but so as not to cover the termination of interconnect traces 406 in FIG. 4.

Next, the second conductive polymer layer is coated onto the second patterned substrate according to the polymer manufacturer specifications so as to cover the second bands and the second discontinuous regions, but so as not to cover the termination of interconnect traces 526 in FIG. 5. Next, the film derived from the electroconductive ITO ink in Example 1 of U.S. Pat. No. 5,763,091 (Kawata, et al.) is coated onto the first conductive polymer layer so as to cover the first bands and the first discontinuous regions, but so as not to cover the termination of interconnect traces 406 in FIG. 4. Finally, the second patterned substrate is laminated to the first patterned substrate with application of pressure. The exposed surface of the second conductive polymer surface (after coating) is adjacent to the surface of the film derived from electroconductive ITO ink on the first patterned substrate, yielding a touch sensor according to FIG. 6 (approximately 40 mm by 60 mm sensing area). The orientation of the second patterned substrate is such that its micropattern of conductive traces faces the pressure-responsive material. The conductive polymer coating, the film coating using electroconductive ITO ink, and the lamination are carried out in such a way that the terminations of interconnect traces 606 and 626 are not covered.

The described two-layer force-sensing touch sensor can be connected to electronics (at the terminations of interconnect traces 606 and 626) designed to probe the resistance between the first patterned substrate and the second patterned substrate, successively at each region of intersection 630. FIG. 6 shows a top plan view of the touch screen sensor element 640 where the first and second patterned substrate have been laminated. Region 630 represents the overlap of the first mesh bands and second mesh bands. Region 632 represents the overlap of the first mesh bands and the second discontinuous region. Region 634 represents the overlap of the second mesh bands and the first discontinuous region. And, region 636 represents the overlap between the first and second discontinuous regions. While there is a plurality of these overlap regions, for ease of illustration, only one region of each has been depicted in the figure. Measurement of resistance with electronics can be carried out by any suitable method in the art. Measurements of resistance for each region of overlap 630 allows for the detection and mapping of changes in resistance across the sensor, as caused by localized pressure (i.e., touch pressure) being applied to the pressure-responsive material in the form of a piezoresistive material. Hence, the above described touch sensor can be used as a positional touch sensor, and the two patterned substrates with micropatterns of conductive traces, together with the piezoresistive pressure-responsive material, represent a positional touch-sensing element. As increasing pressure is applied, resistance is progressively reduced across the pressure-responsive piezoresistive material, due to increased contact between conductive particles. Hence the above described touch sensor can be combined with electronics to yield a force-sensing touch sensor system. The above described touch sensor can be used as a force touch sensor, and the two patterned substrates with micropatterns of conductive traces, together with the piezoresistive pressure-responsive material, represent a force-sensing element. The above described touch sensor is further laminated to a base sheet of 1 millimeter thick polycarbonate. The sensor is laminated with the back side of its second patterned substrate (i.e., major surface without the micropattern of conductive traced disposed thereon) facing the base sheet. Other suitable base sheets are poly(methylmethacrylate) or glass (e.g., 1 millimeter thick). The sensor is laminated to the base sheet using Optically Clear Laminating Adhesive 8172 from 3M Company, St. Paul, Minn. to yield a multilayer construction. The above described touch sensor laminated to a base sheet is overlaid and mounted to the front a liquid crystal display (LCD) with a 30 mm by 41 mm viewable region (i.e., an electronic display, available as ANDpSi025TD-LED-KIT from Purdy Electronics Corporation, Sunnyvale, Calif.). The touch sensor is mounted with its base sheet facing the display. The regions of intersection 630 of the touch sensor overlay the viewable region of the electronic display (i.e., the regions of intersection 630 are disposed within the viewable region of the electronic display).

Example 3

Formation of a Display with a Touch Sensor having Piezoresistive Pressure-Responsive Material The first and second patterned substrates made above can be used to produce a two-layer force-sensing touch sensor as follows, which includes a piezoresistive pressure-responsive material. The pressure-responsive material is included in a multilayer of the following material components in sequence i) a first transparent conductive adhesive layer, ii) a piezoresistive layer, and iii) a second transparent conductive adhesive layer. The band regions of the first and second patterned substrates are first printed with the transparent conductive adhesive material to form the first and second transparent conductive adhesive layers. Transparent conductive adhesive material is prepared according to Example 24 of U.S. Pat. Publ. No. 2003/0114560 (Yang, et al.). The transparent conductive adhesive material is printed using inkjet printing, as is known in the art. A non-conductive pressure-sensitive adhesive material is next printed in all of the complementary regions (complementary to the band regions) of the first and second patterned substrates, except for the terminations of interconnect traces 606 and 626. A non-conductive transparent conductive adhesive material is prepared according to Example 24 of U S. Pat. Publ. No 2003/0114560 (Yang, et al.), except without the addition of Antistatic Agent C. The pressure-responsive material can be interposed between the first and second patterned substrate, with the patterned surface (having a micropattern of conductive traces) of each substrate facing the pressure-responsive material. Next, the film derived from the electroconductive ITO ink in Example 1 of U. S. Pat. No. 5,763,091 (Kawata, et al.) is coated onto the first transparent conductive adhesive layer so as to cover the first bands and the first discontinuous regions, but so as not to cover the termination of interconnect traces 406 in FIG. 4. Finally, the second patterned substrate with second transparent conductive adhesive is laminated to the first patterned substrate with a roller. The exposed surface of the second transparent conductive adhesive surface (after printing) is adjacent to the surface of the film derived from electroconductive ITO ink on the first patterned substrate, yielding a touch sensor according to FIG. 6 (approximately 40 mm by 60 mm sensing area). The orientation of the second patterned substrate is such that its micropattern of conductive traces faces the pressure-responsive material. The adhesive printing, the film coating using electroconductive ITO ink, and the lamination are carried out in such a way that the terminations of interconnect traces 606 and 626 are not covered.

The described two-layer force-sensing touch sensor can be connected to electronics (at the terminations of interconnect traces 606 and 626) designed to probe the resistance between the first patterned substrate and the second patterned substrate, successively at each region of intersection 630. FIG. 6 shows a top plan view of the touch screen sensor element 640 where the first and second patterned substrate have been laminated. Region 630 represents the overlap of the first mesh bands and second mesh bands. Region 632 represents the overlap of the first mesh bands and the second discontinuous region. Region 634 represents the overlap of the second mesh bands and the first discontinuous region. And, region 636 represents the overlap between the first and second discontinuous regions. While there is a plurality of these overlap regions, for ease of illustration, only one region of each has been depicted in the figure. Measurement of resistance with electronics can be carried out by any suitable method in the art. Measurements of resistance for each region of overlap 630 allows for the detection and mapping of changes in resistance across the sensor, as caused by localized pressure (i.e., touch pressure) being applied to the pressure-responsive material in the form of a piezoresistive material. Hence, the above described touch sensor can be used as a positional touch sensor, and the two patterned substrates with micropatterns of conductive traces, together with the piezoresistive pressure-responsive material, represent a positional touch-sensing element. As increasing pressure is applied, resistance is progressively reduced across the pressure-responsive piezoresistive material, due to increased contact between conductive particles. Hence the above described touch sensor can be combined with electronics to yield a force-sensing touch sensor system. The above described touch sensor can be used as a force touch sensor, and the two patterned substrates with micropatterns of conductive traces, together with the piezoresistive pressure-responsive material, represent a force-sensing element. The above described touch sensor is further laminated to a base sheet of 1 millimeter thick polycarbonate. The sensor is laminated with the back side of its second patterned substrate (i.e., major surface without the micropattern of conductive traced disposed thereon) facing the base sheet. Other suitable base sheets are poly(methylmethacrylate) or glass (e.g., 1 millimeter thick). The sensor is laminated to the base sheet using Optically Clear Laminating Adhesive 8172 from 3M Company, St. Paul, Minn. to yield a multilayer construction. The above described touch sensor laminated to a base sheet is overlaid and mounted to the front a liquid crystal display (LCD) with a 30 millimeter by 41 millimeter viewable region (i.e., an electronic display, available as ANDpSi025TD-LED-KIT from Purdy Electronics Corporation, Sunnyvale, California). The touch sensor is mounted with its base sheet facing the display. The regions of intersection 630 of the touch sensor overlay the viewable region of the electronic display (i.e., the regions of intersection 630 are disposed within the viewable region of the electronic display).

Example 4

Formation of a Display with a Touch Sensor having Piezoelectric Pressure-Responsive Material The first and second patterned substrates made above can be used to produce a two-layer force-sensing touch sensor as follows, which includes a piezoelectric pressure-responsive material. The pressure-responsive material is included in a multilayer of the following material components in sequence i) a first transparent conductive adhesive layer, ii) a piezoelectric layer, and iii) a second transparent conductive adhesive layer. The band regions of the first and second patterned substrates are first printed with the transparent conductive adhesive material to form the first and second transparent conductive adhesive layers. Transparent conductive adhesive material is prepared according to Example 24 of U.S. Pat. Publ. No. 2003/0114560 (Yang, et al.). The transparent conductive adhesive material is printed using inkjet printing, as is known in the art. A non-conductive pressure-sensitive adhesive material is next printed in all of the complementary regions (complementary to the band regions) of the first and second patterned substrates, except for the terminations of interconnect traces 606 and 626. A non-conductive transparent conductive adhesive material is prepared according to Example 24 of U.S. Pat. Publ. No. 2003/0114560 (Yang, et al.), except without the addition of Antistatic Agent C. The pressure-responsive piezoelectric material is then interposed between the first and second patterned substrate, with the patterned surface (having a micropattern of conductive traces) of each substrate facing the pressure-responsive material. The piezoelectric layer is a PVDF film prepared according to Comparative Example 1 in U.S. Pat. Publ. No. 2010/0068460 (Moriyama, et al.). The piezoelectric layer is made suitable for adhesion to the adhesive layers by treating each of its major surfaces according to Example 4 of U.S. Pat. No. 6,080,487. The piezoelectric material is interposed by laminating the first and second patterned substrates to the piezoelectric material with a roller, yielding a two-layer touch sensor shown in FIG. 6 (approximately 40 mm by 60 mm sensing area).

The described two-layer force-sensing touch sensor can be connected to electronics (at the terminations of interconnect traces 606 and 626) designed to probe the electrical potential of each of the first bands and second bands. FIG. 6 shows a top plan view of the touch screen sensor element 640 where the first and second patterned substrate have been laminated. Region 630 represents the overlap of the first mesh bands and second mesh bands. Region 632 represents the overlap of the first mesh bands and the second discontinuous region. Region 634 represents the overlap of the second mesh bands and the first discontinuous region. And, region 636 represents the overlap between the first and second discontinuous regions. While there was a plurality of these overlap regions, for ease of illustration, only one region of each has been depicted in the figure. Measurement of voltage with electronics can be carried out by any suitable method in the art. Measurements of voltage for each band allows for the detection and mapping of changes in voltage across the sensor, as caused by localized pressure (i.e., touch pressure) being applied to the pressure-responsive material in the form of a piezoelectric material. Hence, the above described touch sensor can be used as a positional touch sensor, and the two patterned substrates with micropatterns of conductive traces, together with the piezoelectric pressure-responsive material, represent a positional touch-sensing element. As increasing pressure is applied, the magnitude of voltage is progressively increased across the pressure-responsive piezoelectric material, as described by its piezoelectric property and quantified by its piezoelectric coefficients. Hence the above described touch sensor can be combined with electronics to yield a force-sensing touch sensor system. The above described touch sensor can be used as a force touch sensor, and the two patterned substrates with micropatterns of conductive traces, together with the piezoelectric pressure-responsive material, represent a force-sensing element. The above described touch sensor is further laminated to a base sheet of 1 mm thick polycarbonate. The sensor is laminated with the back side of its second patterned substrate (i.e., major surface without the micropattern of conductive traced disposed thereon) facing the base sheet. Other suitable base sheets are poly(methylmethacrylate) or glass (e.g., 1 mm thick). The sensor is laminated to the base sheet using Optically Clear Laminating Adhesive 8172 from 3M Company, St. Paul, Minn. to yield a multilayer construction. The above described touch sensor laminated to a base sheet is overlaid and mounted to the front a liquid crystal display (LCD) with a 30 mm by 41 mm viewable region (i.e., an electronic display, available as ANDpSi025TD-LED-KIT from Purdy Electronics Corporation, Sunnyvale, Calif.). The touch sensor is mounted with its base sheet facing the display. The regions of intersection 630 of the touch sensor overlay the viewable region of the electronic display (i.e., the regions of intersection 630 are disposed within the viewable region of the electronic display).

Example 5

Formation of a Display with a Touch Sensor having Deformable Dielectric Pressure-Responsive Material The first and second patterned substrates made above are used to produce a two-layer force-sensing touch sensor as follows, which includes a dielectric pressure-responsive material. The pressure-responsive material is interposed between the first and second patterned substrates, with the patterned surface (having a micropattern of conductive traces) of each substrate facing the pressure-responsive material. The pressure-responsive material is an electrically insulating spring membrane. The PET spring membrane with adhesive layers of touch pad 1000 of U.S. Pat. No. 7,538,760 is used as the pressure-responsive material. A piece of the pressure-responsive material is cut to the size of the arrays of bands of the first and second patterned substrates. The pressure-responsive material is laminated with a roller to the conductor-patterned surface of the first patterned substrate surface so as to cover the first bands and the first discontinuous regions, but so as not to cover the terminations of interconnect traces 606 in FIG. 4. Next, the second patterned substrate is laminated with a roller to the surface of the pressure-responsive material, yielding a touch sensor according to FIG. 6 (approximately 40 mm by 60 mm sensing area). The orientation of the second patterned substrate is such that its micropattern of conductive traces faces the pressure-responsive material. The laminations are carried out in such a way that the terminations of interconnect traces 606 and 626 are not covered, allowing electrical contact to be made to the terminations of the interconnect traces.

The described two-layer force-sensing touch sensor can be connected to electronics (at the terminations of interconnect traces 606 and 626) designed to probe the capacitance between the first patterned substrate and the second patterned substrate, successively at each region of intersection 630 (i.e., mutual capacitance). FIG. 6 shows a top plan view of the touch screen sensor element 640 where the first and second patterned substrate have been laminated. Region 630 represents the overlap of the first mesh bands and second mesh bands. Region 632 represents the overlap of the first mesh bands and the second discontinuous region. Region 634 represents the overlap of the second mesh bands and the first discontinuous region. And, region 636 represents the overlap between the first and second discontinuous regions. While there is a plurality of these overlap regions, for ease of illustration, only one region of each has been depicted in the figure.

Electronics used to make mutual capacitance measurements of the transparent sensor element (bands) are PIC18F87J10 (Microchip Technology, Chandler, Ariz.), AD7142 (Analog Devices, Norwood, Mass.), and MM74HC154WM (Fairchild Semiconductor, South Portland, Me.). The PIC18F87J10 is the microcontroller for the system. It controls the selection of sensor bands which MM74HC154WM drives. It also configures the AD7142 to make the appropriate measurements. Use of the system includes setting a number of calibration values, as is known in the art. These calibration values can vary from touch screen to touch screen. The system can drive 16 different bands and the AD7142 can measure 12 different bands. The configuration of the AD7142 includes selection of the number of channels to convert, how accurately or quickly to take measurements, if an offset in capacitance should be applied, and the connections for the analog to digital converter. The measurement from the AD7142 is a 16 bit value representing the capacitance of the cross point between conductive bands in the matrix of the transparent sensor element.

After the AD7142 completes its measurements, it signals the microcontroller, via an interrupt, to tell it to collect the data. The microcontroller then collects the data over the SPI port. After the data is received, the microcontroller increments the MM74HC154WM to the next drive line and clears the interrupt in the AD7142 signaling it to take the next set of data. While the sampling from above is constantly running, the microcontroller is also sending the data to a computer with monitor via a serial interface. This serial interface allows a simple computer program, as are known to those of skill in the art, to render the raw data from the AD7142 and see how the values were changing between a touch and no touch. The computer program renders different color across the display, depending on the value of the 16 bit value. When the 16 bit value is below a certain value, based on the calibration, the display region is rendered white. Above that threshold, based on the calibration, the display region is rendered green. The data are sent asynchronously in the format of a 4 byte header (0xAAAAAAAA), one byte channel (0x00–0x0F), 24 bytes of data (represents the capacitive measurements), and carriage return (0x0D). Measurements of mutual capacitance for each region of overlap 630 allows for the detection and mapping of changes in capacitance across the sensor, as caused by localized pressure (i.e., touch pressure) being applied to the pressure-responsive material in the form of a deformable dielectric material. Hence, the above described touch sensor can be used as a positional touch sensor, and the two patterned substrates with micropatterns of conductive traces, together with the deformable dielectric pressure-responsive material interposed, represent a positional touch-sensing element. As increasing pressure is applied, capacitance is progressively increased across the pressure-responsive piezoresistive material, due to decreased separation between the first bands and the second bands. Hence the above described touch sensor can be combined with electronics to yield a force-sensing touch sensor system. The above described touch sensor can be used as a force touch sensor, and the two patterned substrates with micropatterns of conductive traces, together with the deformable dielectric pressure-responsive material interposed, represent a force-sensing element. The above described touch sensor is further laminated to a base sheet of 1 millimeter thick polycarbonate. The sensor is laminated with the back side of its second patterned substrate (i.e., major surface without the micropattern of conductive traced disposed thereon) facing the base sheet. Other suitable base sheets are poly(methylmethacrylate) or glass (e.g., 1 mm thick). The sensor is laminated to the base sheet using Optically Clear Laminating Adhesive 8172 from 3M Company, St. Paul, Minn. to yield a multilayer construction. The above described touch sensor laminated to a base sheet is overlaid and mounted to the front a liquid crystal display (LCD) with a 30 millimeter by 41 mm viewable region (i.e., an electronic display, available as ANDpSi025TD-LED-KIT from Purdy Electronics Corporation, Sunnyvale, Calif.). The touch sensor is mounted with its base sheet facing the display. The regions of intersection 630 of the touch sensor overlay the viewable region of the electronic display (i.e., the regions of intersection 630 are disposed within the viewable region of the electronic display).

Example 6

Formation of a Display with a Touch Sensor having Integrated Strain Gauges

A touch sensor with force-sensing elements is fabricated according to the following steps. A base sheet substrate is provided. Strain gauge elements (force-sensing elements) comprising micropatterns of metallic traces are integrated onto the surface of the base sheet. The strain gauges are connected to electronics suitable for measuring the resistance for current passing through the strain gauges.

Strain gauges comprising micropatterned of metallic conductor traces are fabricated on a base sheet by microcontact printing and etching. A base sheet of polycarbonate measuring 2 mm in thickness is vapor coated with 100 nm silver thin film using a thermal evaporative coater to yield a first silver metalized film. The polycarbonate base sheet is commercially available as LEXA available from SABIC Innovative Plastics, Riyadh, Saudi Arabia, and measures 168 mm by 220 mm. The silver is available from Cerac Inc., Milwaukee, Wis. as 99.99% pure 3 mm shot.

A PDMS stamp having a thickness of 3 mm, is molded against a 10 cm diameter silicon wafer (sometimes referred to in the industry as a "master") that has previously been patterned using standard photolithography techniques. The PDMS is available as product SYLGARD 184, Dow Chemical Co., Midland, Mich. The PDMS is cured on the silicon wafer at 65° C. for 2 h. Thereafter, the PDMS is peeled away from the wafer to yield a stamp having a pattern of raised features. The raised features of the stamp include a region with a continuous square mesh pattern (mesh loop) and a region with a discontinuous square mesh pattern. The continuous square mesh pattern takes the form of the mesh loop of FIG. 1*b*. That is, the raised features define the edges of edge-sharing squares that define a continuous square mesh loop (continuous, unbroken, mesh loop illustrated in FIG. 1*b*). A discontinuous square mesh pattern is one that contains selective breaks in line segments that would otherwise define a complete square mesh pattern. The PDMS stamp includes discontinuous square mesh pattern in regions complementary to the mesh loop of FIG. 1*b* (not shown). The breaks are designed to be approximately 5 µm. In order to reduce their visibility, preferably, the breaks should be less than 10 µm, more preferably, 5 µm or less, e.g., between 1 µm and 5 µm. Each raised square outline pattern has a height of 2 µm, has 2% area coverage, corresponding to 98% open area, and line segments of 2 µm in width. The square mesh has a pitch of 200 µm. The stamp has a first structured side that has the square mesh pattern regions and the interconnect trace features and an opposing second substantially flat side.

The base sheet with integrated strain gauges (force-sensing elements) is prepared as follows. The stamp is placed, structured side up, in a glass Petri dish containing 2 mm diameter glass beads. Thus, the second, substantially flat side is in direct contact with the glass beads. The beads serve to lift the stamp away from the base of the dish, allowing the following ink solution to contact essentially all of the flat side of the stamp. A 10 mM ink solution of 1-octadecanethiol (available from TCI America, Portland Oreg.) in ethanol is pipetted into the Petri dish beneath the stamp. The ink solution is in direct contact with the second substantially flat side of the stamp. After sufficient inking time (e.g., 3 h) where the ink has diffused into the stamp, the first stamp is removed from the petri dish. The base sheet is placed, metallized side up, onto a working surface. The stamp is placed on the metalized base sheet surface within 1 cm of a corner, oriented as shown in FIG. 1, with the ends of the loop directed toward the corner. The inked stamp is allowed to contact the metalized substrate for 15 s, and then removed. The above described stamping procedure is repeated for the other three corners of the base sheet. The base sheet is placed for three minutes into a silver etchant solution, which contains (i) 0.030 molar thiourea (Sigma-Aldrich, St. Louis, Mo.) and (ii) 0.020 M ferric nitrate (Sigma-Aldrich) in deionized water. After the etching step, the resulting base sheet is rinsed with deionized water and dried with nitrogen gas to yield a first patterned surface. Where the inked stamp made contact with the silver of the first metalized base sheet, the silver remains after etching. Thus silver is removed from the locations where contact is not made between the inked stamp and silver film. The result is the integration of four mesh loop transparent strain gauges on the polycarbonate base sheet, one in each corner.

FIG. 1 shows the resulting touch sensor with transparent mesh loop strain gauges, force-sensing elements 104 (each comprising a micropattern of metallic traces) integrated on the polycarbonate base sheet, the strain gauges taking the form of conductive mesh loops (shown in FIG. 1*b*). The mesh loop strain gauges exhibit electrical resistance that changes in response to deformation of the base sheet. Specifically, for the base sheet oriented with its integrated strain gauges on the back side relative to touch pressure, supported at its corners, increasing touch pressure causes the gauges to be stretched and causes their electrical resistance values to be raised. The degree of change in electrical resistance is approximately proportional to the force applied to the touch sensor. Hence each mesh loop strain gauge, comprising a micropattern of conductive traces, constitutes a force-sensing element 104. The position of a touch can be determined by comparing the changes in resistance for the four strain gauges (force-sensing elements), following calibration procedures, as is known in the art, for example in U.S. Pat. Publ. No. 2009/0243817 (Son). Each mesh loop strain gauge, comprising a micropattern of conductive traces, constitutes a positional touch-sensing element. The above described touch sensor is overlaid and mounted to the front a liquid crystal display (LCD) with a 158 mm by 210 mm viewable region (i.e., an electronic display, available as ANDpSi104EA5S-HB-KIT from Purdy Electronics Corporation, Sunnyvale, Calif.). The touch sensor is mounted with its integrated strain gauges facing the display. The integrated strain gauges (force-sensing elements 104) of the touch sensor overlay the viewable region of the electronic display (i.e., the force-sensing elements 104 are disposed within the viewable region of the electronic display).

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited in this disclosure are herein incorporated by reference in their entirety.

What is claimed is:

1. A touch sensor comprising:
a transparent, insulating substrate; and
at least one U-shaped electrically conductive micromesh comprising traces disposed on the substrate, each micromesh in the at least one U-shaped electrically conductive micromesh having a uniform and periodic mesh pattern throughout the U-shaped micromesh, the traces comprising an elemental metal or an alloy of elemental metal.

2. The touch sensor of claim 1, wherein the at least one U-shaped electrically conductive micromesh comprises a plurality of U-shaped electrically conductive micromeshes.

3. The touch sensor of claim 2, wherein each of the plurality of U-shaped electrically conductive micromeshes is disposed to overlay a corner of a viewable portion of a display.

4. The touch sensor of claim 1, wherein each micromesh in the at least one U-shaped electrically conductive micromesh has an open area fraction of between 80 and 99.75 percent.

5. The touch sensor of claim 1, wherein each micromesh in the at least one U-shaped electrically conductive micromesh has an open area fraction of between 90 and 99.5 percent.

6. The touch sensor of claim 1, wherein the traces of each micromesh in the at least one U-shaped electrically conductive micromesh have a width of between 0.5 and 20 micrometers.

7. The touch sensor of claim 1, wherein the traces of each micromesh in the at least one U-shaped electrically conductive micromesh have a width of between 1 and 5 micrometers.

8. The touch sensor of claim 1, wherein the traces of each micromesh in the at least one U-shaped electrically conductive micromesh have a width of about [X+0.5] in units of micrometers, and an open area fraction between about [95−X]% and 99.5%, where $0 \leq X \leq 4.5$.

9. The touch sensor of claim 1, wherein the traces of each micromesh in the at least one U-shaped electrically conductive micromesh have a width of about [X+0.5] in units of micrometers, and an open area fraction of between about [98.5−(2.5X÷3.5)]% and [99.5−(X÷3.5)]%, where $0 \leq X \leq 3.5$.

10. The touch sensor of claim 1, wherein the at least one U-shaped electrically conductive micromesh comprises first and second U-shaped electrically conductive micromeshes, the touch sensor further comprising electronics connected to the first and second U-shaped electrically conductive micromeshes, the electronics being configured to determine differentials in response from the first and second U-shaped electrically conductive micromeshes and to use the differentials in response to determine a position of a touch.

11. The touch sensor of claim 1, wherein the traces comprise nickel, palladium, platinum, molybdenum, gold, silver, or a combination thereof.

12. The touch sensor of claim 1, wherein the substrate comprises a polymer sheet or a glass sheet.

13. The touch sensor of claim 1, wherein the substrate comprises poly(methylmethacrylate) or polycarbonate.

14. An article comprising an electronic display and the touch sensor of claim 1 disposed upon the display.

15. The article of claim 14, wherein the at least one U-shaped electrically conductive micromesh overlays at least a portion of a viewable region of the display without substantially obscuring the viewable region of the display.

16. The article of claim 14, wherein the display comprises pixels and wherein for each trace in the at least one U-shaped electrically conductive micromesh, a width of the trace is less than half of a width of the pixels in a direction of the width of the trace.

17. The article of claim 16, wherein for each trace in the at least one U-shaped electrically conductive micromesh, the width of the trace is less than 10% of the width of the pixels in the direction of the width of the trace.

18. A touch sensor comprising:
a transparent, insulating substrate;
at least one U-shaped electrically conductive micromesh comprising traces disposed on the substrate, each micromesh in the at least one U-shaped electrically conductive micromesh having a uniform and periodic mesh pattern, the traces comprising an elemental metal or an alloy of elemental metal; and
electronics configured to measure a resistance for current passing through the at least one U-shaped electrically conductive micromesh and determine therefrom a location and a magnitude of a force of a touch.

19. An article comprising an electronic display and a touch sensor disposed upon the display, the touch sensor comprising:
a transparent, insulating substrate; and
at least one U-shaped electrically conductive micromesh comprising traces disposed on the substrate, each micromesh in the at least one U-shaped electrically conductive micromesh having a uniform and periodic mesh pattern, the traces comprising an elemental metal or an alloy of elemental metal,
wherein the at least one U-shaped electrically conductive micromesh overlays at least a portion of a viewable region of the display without substantially obscuring the viewable region of the display, wherein the at least one U-shaped electrically conductive micromesh comprises at least one force sensing element, and wherein the touch sensor further comprises a separate positional touch-sensing element overlaying at least a portion of the viewable region of the display.

20. The article of claim 19, wherein the separate positional touch-sensing element comprises a resistive positional touch-sensing element, a surface-capacitive positional touch-sensing element, or a projected capacitive positional touch-sensing element.

* * * * *

UNITED STATES PATENT AND TRADEMARK OFFICE
CERTIFICATE OF CORRECTION

PATENT NO. : 10,613,668 B2
APPLICATION NO. : 15/873264
DATED : April 7, 2020
INVENTOR(S) : Matthew Frey et al.

Page 1 of 1

It is certified that error appears in the above-identified patent and that said Letters Patent is hereby corrected as shown below:

On the Title Page

Column 1 (Item (54) Title)
Lines 1-2, delete "AU-SHAPED ELECTRONICALLY CONDUCIVE" and insert -- A U-SHAPED ELECTRICALLY CONDUCTIVE --, therefor.

In the Specification

Column 1
Lines 1-2, delete "AU-SHAPED ELECTRONICALLY CONDUCIVE" and insert -- A U-SHAPED ELECTRICALLY CONDUCTIVE --, therefor.

Column 22
Line 39 (Approx.), delete "U S." and insert -- U. S. --, therefor.

Signed and Sealed this
Thirteenth Day of October, 2020

Andrei Iancu
*Director of the United States Patent and Trademark Office*